(12) United States Patent
Anteau

(10) Patent No.: US 9,234,494 B2
(45) Date of Patent: Jan. 12, 2016

(54) POWER GENERATOR

(71) Applicant: Mark R. Anteau, Columbus, OH (US)

(72) Inventor: Mark R. Anteau, Columbus, OH (US)

( * ) Notice: Subject to any disclaimer, the term of this patent is extended or adjusted under 35 U.S.C. 154(b) by 0 days.

(21) Appl. No.: 14/133,637

(22) Filed: Dec. 18, 2013

(65) Prior Publication Data

US 2014/0312623 A1    Oct. 23, 2014

Related U.S. Application Data

(63) Continuation-in-part of application No. 13/537,046, filed on Jun. 28, 2012.

(60) Provisional application No. 61/738,693, filed on Dec. 18, 2012, provisional application No. 61/755,204, filed on Jan. 22, 2013, provisional application No. 61/501,870, filed on Jun. 28, 2011.

(51) Int. Cl.

| F03B 3/00 | (2006.01) |
|---|---|
| F03B 17/00 | (2006.01) |
| F03G 7/04 | (2006.01) |
| F03B 17/02 | (2006.01) |
| F03B 13/08 | (2006.01) |

(52) U.S. Cl.
CPC .............. *F03B 17/005* (2013.01); *F03B 13/08* (2013.01); *F03B 17/025* (2013.01); *F03G 7/04* (2013.01); *F05B 2240/93* (2013.01); *Y02E 10/20* (2013.01); *Y02E 10/22* (2013.01); *Y02E 60/17* (2013.01); *Y10S 415/916* (2013.01)

(58) Field of Classification Search
CPC .......... F03B 15/00; F03B 15/14; F03B 15/02; F03B 17/005; F03B 17/02; F03B 17/025; F03G 7/04

USPC .......................... 60/398, 495–507; 290/42, 53
See application file for complete search history.

(56) References Cited

U.S. PATENT DOCUMENTS

| 3,648,458 | A | | 3/1972 | McAlister | |
|---|---|---|---|---|---|
| 4,083,186 | A | * | 4/1978 | Jackson, Sr. | .......... F03B 13/187 417/339 |
| 4,450,690 | A | * | 5/1984 | Clark, Jr. | ........................ 62/116 |
| 4,617,801 | A | * | 10/1986 | Clark, Jr. | ........................ 62/116 |
| 4,819,697 | A | * | 4/1989 | Randa et al. | .................... 138/30 |
| 4,883,411 | A | * | 11/1989 | Windle | ........................ 417/331 |
| 5,329,497 | A | | 7/1994 | Previsic et al. | |
| 5,426,332 | A | | 6/1995 | Ullman et al. | |
| 6,250,199 | B1 | * | 6/2001 | Schulte et al. | .................. 91/4 R |
| 6,800,954 | B1 | * | 10/2004 | Meano | ............... F03B 13/1895 290/42 |
| 6,803,670 | B2 | * | 10/2004 | Peloquin | .............. F03B 17/025 290/42 |
| 7,926,501 | B2 | * | 4/2011 | Springett et al. | ................ 137/14 |
| 8,049,351 | B2 | * | 11/2011 | Mahawili | ........................ 290/44 |
| 2010/0194116 | A1 | * | 8/2010 | Mahawili | ........................ 290/55 |
| 2011/0258996 | A1 | * | 10/2011 | Ingersoll et al. | ................ 60/421 |
| 2012/0167563 | A1 | | 7/2012 | Cherepashenets et al. | |

* cited by examiner

*Primary Examiner* — Craig Schneider
*Assistant Examiner* — Angelisa L Hicks
(74) *Attorney, Agent, or Firm* — Standley Law Group LLP

(57) ABSTRACT

The power plant disclosed is an engine that derives is usefulness in the pursuit of energy generation by utilizing natural pressure differentials found in various liquids and gases, such as but not limited to water and air. It is generally a two-stroke piston cycle engine, wherein the actions of the pistons perform work or replenish working fluid from a lower head to a higher head, and can be utilized to generate power, pump fluids, or perform work, for example.

12 Claims, 35 Drawing Sheets

FIG. 12A   FIG. 12B   FIG. 12C

POWER GENERATOR

CROSS-REFERENCE TO RELATED APPLICATIONS

This application claims priority to, the benefit of, and is a continuation in part of U.S. patent application Ser. No. 13/537,046 filed 28 Jun. 2012, and also claims priority to and the benefit of U.S. Provisional Application No. 61/738,693 filed 18 Dec. 2012 and U.S. Provisional Application No. 61/755,204 filed 22 Jan. 2013, the content of all of which are hereby incorporated by reference as if fully recited herein.

TECHNICAL FIELD

This disclosure relates to the field of power generation, and more specifically to power generation systems and methods based on renewable energy and pressure differential principles.

BACKGROUND OF THE INVENTION

As energy sources based on fossil fuels become ever more expensive to maintain and their environmental cost is realized and quantified, the world has turned to renewable energy sources to combat these disadvantages of traditional energy generation methods. A sharply increasing demand curve continues to push the need for innovative new ways to generate power. There is thus a current need for new sources of energy that utilize renewable sources to generate that energy.

A particularly salient obstacle to power generation is the power input needed for use in the generation scheme. The input power required will inherently reduce the efficiency, and therefore the viability of, the system. Therefore, there is a need for a power generation scheme that utilizes natural phenomenon to both reduce the input power required to operate the system and to provide an energy source that greater than the input power that the system can convert to a form of usable energy.

Previous work by the inventor has disclosed a power generation system based upon the use of, in combination or in part, natural pressure gradients, fluid flow and buoyant forces, for example in U.S. patent application Ser. No. 13/537,046. While those disclosed systems and methods have been shown to be effective in power generation, there remains further need for efficiency gains and variations upon these systems and methods in order to meet society's ever-growing energy needs effectively and in an environmentally friendly manner.

BRIEF SUMMARY OF THE INVENTION

Exemplary embodiments of the present disclosure pertain to power generation systems of reusable energy sources, and improvements thereon having increased efficiencies.

These and other advantages are provided by the invention described and shown in more detail below.

BRIEF DESCRIPTION OF THE SEVERAL VIEWS OF THE DRAWINGS

Novel features and advantages of the present invention, in addition to those mentioned above, will become apparent to those skilled in the art from a reading of the following detailed description in conjunction with the accompanying drawings wherein identical reference characters refer to identical parts and in which.

DETAILED DESCRIPTION OF THE INVENTION

Figure 1:
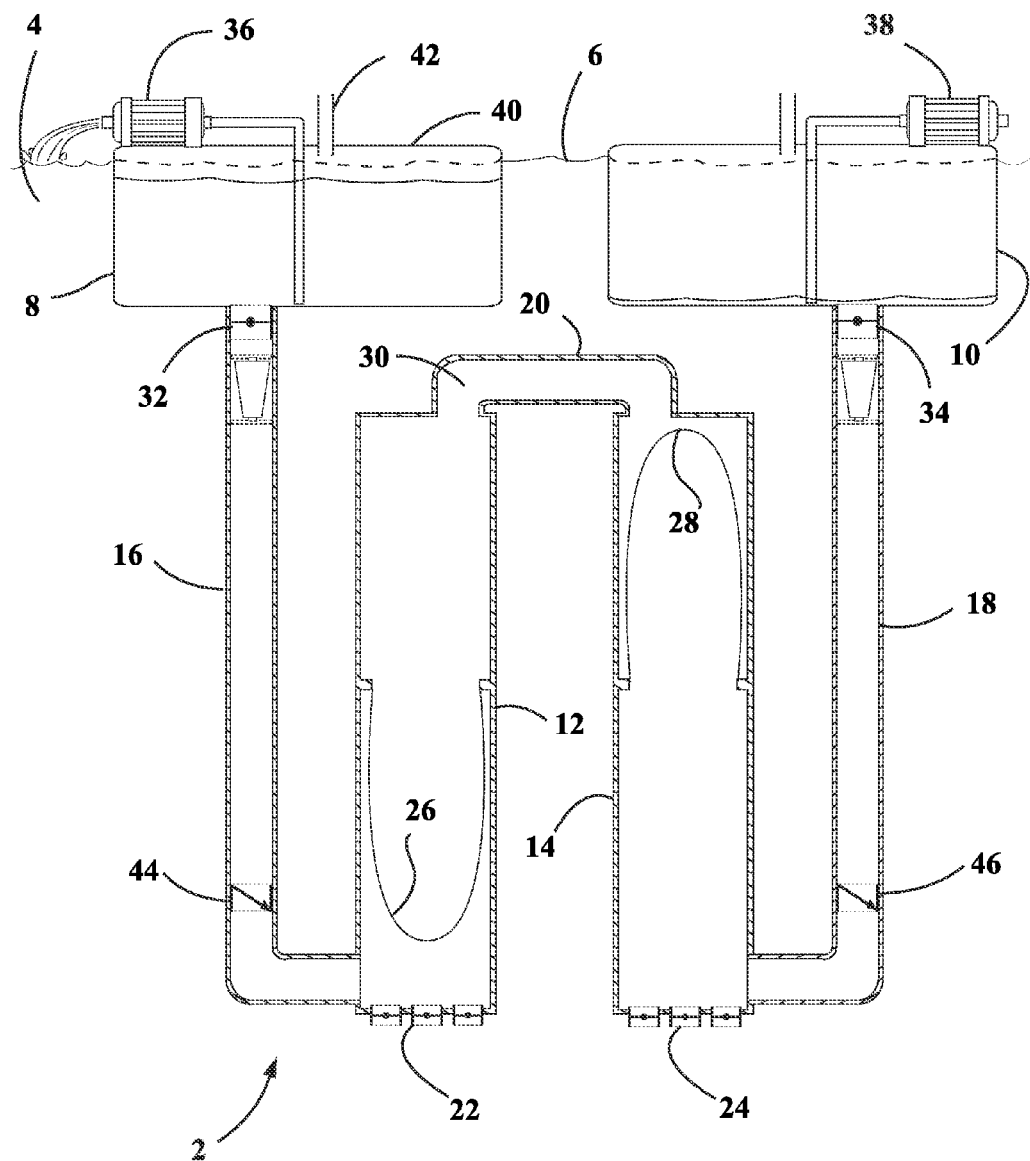
FIG. 1 depicts a first exemplary embodiment of the invention utilizing fluid flow turbine generators to generate power at the beginning of a stroke.

The invention is a power generation plant that incorporates new efficient systems and methods of extracting and converting energy through fluid flow based upon renewable energy. It preferably provides a constant rate of power twenty-four hours a day for as long as necessary. It is designed to provide alternating current (AC), direct current (DC), or direct mechanical force.

The invention can be perceived as an engine that runs on water or some other suitable liquid, gas, or combination of liquids and gases, which make up the "fuel" that operates its two-stroke piston cycle. As will be explained in further detail below, the invention is modular in that many of the embodiments described herein may be interconnected (e.g., daisy-chained) to form more complicated systems that may be more properly categorized as multi-stroke systems. Therefore, the use of the term stroke is meant to be illustrative and for explanatory purposes only, and should not be perceived as limiting the claimed invention.

Fluid flow through the system due to pressure differentials performs the work. Two examples of work that can be performed are electricity generation and pumping fluids. Direct mechanical work can be performed as needed as well, depending on the application and environmental circumstances.

The invention is made up of a power station that performs work and a return system that evacuates the water from the power plant and returns it back to the head. The exact specifications disclosed herein including, but not limited to shapes, sizes, positioning of components, the elevation/depth of components and materials utilized will be chosen by those skilled in the art to meet particular application parameters, and should be tested for maximum efficiency. Additionally, any design specifications mentioned in this document are merely illustrative of the operation of the overall system. These calculations and tests are within the abilities of one skilled in the art of power generation and fluid dynamics, enabling them to practice the invention disclosed herein without undue experimentation or further invention.

Additionally, the diagrams that are presented herein merely serve to facilitate the explanation of the principles of operation of the invented system and its various methods of operation and are not meant to imply exact scale of any particular design that has been engineered for a specific purpose. The relative volumes and configurations of various power plant components, which will vary according to individual needs and certain applications, will be of particular importance to efficiency results. Certain features depicted in the figures that follow have been exaggerated in order to more clearly explain the principles taught by this disclosure.

Furthermore, the structural frame supporting the power plant, the support frame and configuration of pontoons, as well as mechanical systems, electronic devices, and general control systems utilized in the operation of this system are not described but they are implied. Control systems will need to be employed in any given application of the invention to operate doors and coordinate the timing of the various systems, pumps, doors, multiple return stations, etc. Control systems and electronic devices can include but are not limited to computers, smart boards, motors, microwave devices, sensors and solenoids required to operate doors, pumps, valves, vents, generator connections and other operational systems. Again, the design of these systems and devices is within the ability of one skilled in the relevant arts without undue experimentation or further invention, and may vary depending on the particular application on which the invention is being implemented.

The invention can operate in various environments such as but not limited to: lakes, oceans, above ground, below ground, under water, space stations, man-made reservoirs (including tanks), combinations thereof, and other environments. Placing the invention in a man-made reservoir enables this type of power plant to operate away from large sources of water such as but not limited to: oceans, lakes, and rivers. The water supply for the man-made reservoir can be supplied by items such as but not limited to: a pipe system, water tankers (trains, trucks, ships, barges, planes, jets, helicopters, blimps), and underground water. The size of this type of reservoir and the size of the system being placed inside of it depends upon the amount of work or electricity desired. For the purposes of this disclosure, the term "reservoir" shall be taken to encompass any receptacle, container or fluid body generally, whether open or closed, or formed naturally or made by man.

Although this specification discloses the invention primarily using water and air in its operation, any suitable liquid, gas or solution can be substituted or combined if desirable for a particular application. One example would be to add something to the water to inhibit the water from freezing in very cold climates. Another might utilize natural liquids or gases present nearest to the point of power need, such as bodily fluids for small applications. If something is used other then water to generate electricity by the power plant that is environmentally unfriendly, then the invention may need to be placed in a man-made reservoir and its water supply recycled so there is no adverse impact on the environment.

This type of power plant can be built and operated as a source for distributed allocation of electric power allowing it to provide electricity to a power grid system. Connecting the invention to a power grid system would allow the power plant to provide electricity to large regions such as but not limited to towns, cities, counties, districts, provinces and states. The invention can also be implemented as a single free standing unit or a system of interconnecting units to provide electricity to specific facilities such as but not limited to: manufacturing plants, shopping malls, stores, office buildings, hospitals, military bases, multifamily residences, single family homes, ocean liners, cargo ships, oil tanker ships, naval vessels as well as other facilities. Additionally, the invention can be implemented as a portable unit to provide electricity for: military camps and mobile combat units, commercial functions like fairs and construction sites, private uses like camping and recreation, as well as providing electricity to other entities and other functions. The system can be scaled down to power an artificial heart or pump blood. The operation of the invention in a tank—whether external or self contained—allows it to be utilized in various environments as a source for distributed allocation of electricity, as a single freestanding unit or system, and as a portable unit. It can be used on-site at, for instance, oil and gas well locations as a means for pumping materials to the surface. It can be scaled up or down in size to meet the desired requirements.

The plant's return system can be incorporated into existing hydroelectric power plants to enable them to return water back to the head at considerable energy and economic savings. This will allow these existing hydroelectric power plants to preferably operate 24 hours a day for as long as necessary without severely affecting the water level of the head and at the same time allowing the power plant to become increasingly economically efficient and environmentally friendly. Additionally, parts of the invented system can be added to submarines and other entities to improve their efficacy in evacuating water from their ballast tanks, as well as improve the energy consumption during the transmission of low-pressure fluids into higher-pressure fluids. The aforementioned examples represent only two of many ways in which the invention or components of the invention can be incorporated to enhance current technology.

The system generates electricity that can be used outside the power plant because a natural source of renewable energy—e.g., water—provides the vast majority of the work needed to generate the power or electricity, and that same water is recycled in the power plant to help evacuate the water that enters the power plant, and because hydrostatic pressure maintains the head of water in the connecting pipes between the power chambers and their respective pumping and other subsystems at points of discharge from the power plant. The force of some embodiments' pontoon subsystems are in a state of potential energy when they are at rest either at the top or bottom of their respected pontoon chambers—depending on the particular configuration being employed. When the pontoons move downward or upward, their potential energy transforms into kinetic energy. Since the driving force behind the pontoons is buoyancy, use of the pontoons can provide a free source of natural energy.

The same principles apply to systems placing the connecting rod systems and the coil tube systems at or just below a state of neutral buoyancy. The skilled artisan may employ the state of buoyancy that best accomplishes the goals of the invention in accordance with a particular application. References to neutral or nearly-neutral buoyancy herein thus refer to component buoyancy states that may be static or altered or adjusted during operation of the invention to achieve desired positive, negative or neutral buoyant forces with respect to the weight of a component.

Turning to FIG. 1, the basic principles that serve as a basis for the current invention are described. FIG. 1 depicts the general principles and features of the invention in an embodiment of a proof-of-concept model. The power system 2 is generally depicted secured within a body of water or reservoir 4 having a surface level 6. The fluid in which the power system 2 operates need not be water and can consist of any nearly incompressible fluid with comparable characteristics. Water was merely chosen as the preferred medium due to its natural pervasiveness and ease of use, and is used throughout this disclosure for illustrative, but not limiting, purposes.

A basic feature of the invention is the continuous and cyclical filling of return chambers that occurs as the fluid within the boundaries of the power system 2 reaches equilibrium pressure levels when exposed to the surrounding reservoir 4. For example, FIG. 1 depicts a first holding tank 8 and a second holding tank 10. The first holding tank 8 and the second holding tank 10 are each connected to a first power chamber 12 and a second power chamber 14, respectively. The first holding tank 8 is connected to the first power chamber 12 via a first evacuation tube 16, and the second holding tank 10 is connected to the second power chamber 14 via a second evacuation tube 18. The volumes of both the first power chamber 12 and the second power chamber 14 are connected via a connecting pipe 20 to enable fluid flow between the chambers 12 and 14.

Both the first power chamber 12 and the second power chamber 14 can be put in fluid flow connection with the reservoir 4 external to the power system 2 via a first power chamber external valve 22 and a second power chamber external valve 24, respectively. The first 22 and second 24 power chamber external valves may actually consist of multiple gates or valves positioned across the bottom of the first 12 and second 14 power chambers, or a single gate or valve configuration may be used. Depending on the application demands, multiple, smaller gates as shown in FIG. 1 may be desirable if short cycle times are required and it is determined that such a configuration allows for a smaller transition to full flow capacity than that available with a single, larger gate. Throughout this disclosure, the terms first and second power chamber external valve should be construed as covering both multiple or single valve configurations for convenience.

The first power chamber 12 includes a first elastic boundary 26 comprised of an elastic material and separating a top portion of the first power chamber 12 from the bottom portion of the first power chamber 12 with respect to fluid flow. The first elastic boundary 26 can be expanded and contracted as needed, and transmits pressure changes through the boundary while inhibiting fluid flow between the top and bottom portions of the first power chamber 12. Likewise, the second power chamber 14 includes a second elastic boundary 28 having similar characteristics. In the particular configuration shown in FIG. 1, these elastic boundaries 26 and 28 are included as helpful visualizations and are illustrative of the operation of the proof-of-concept model. They define a constant volumetric flow region 30 that includes the top portion of both the first 12 and second 14 power chambers, as well as the interior of the connecting pipe 20. The movement of the constant volumetric flow region bounded by the elastic boundaries 26 and 28 (which experiences no or a de minimus change in the volume of fluid contained therein) in the following detailed description of FIG. 1 and the figures that follow will illustrate principles of the current invention.

Each holding tank is connected to the distal end of its corresponding evacuation tube. At each connection point exists a holding tank valve, such as the first holding tank valve 32 for the first holding tank 8 and a second holding tank valve 34 for the second holding tank 10. The main purpose of the holding tanks is to receive a volume of fluid as it flows through the system, isolate it from the rest of the system, and return its contents into the fluid body reservoir 4 by pumping the short head of fluid contained within. Also, each evacuation chamber can optionally include various check valves, such as the first evacuation tube check valve 44 for the first evacuation tube 16 and the second evacuation tube check valve 46 for the second evacuation tube 18.

For example, FIG. 1 shows a first holding tank pump 36 and a second holding tank pump 38, for example velocity pumps such as centrifugal pumps, although any suitable pump type may be chosen by those skilled in the art. Each is to be used to return fluid in its corresponding holding tank to the fluid body reservoir 4 once the filling of the holding tank is complete and it is isolated in fluid flow from the rest of the system by the closing of the corresponding holding tank valve. Here, the first holding tank 8 has been filled and isolated from the first evacuation tube 16, and the first holding tank pump 36 has begun evacuating the fluid from the first holding tank 8 thereby returning it to the fluid body reservoir 4.

Several considerations should be noted with respect to the holding tanks and their configurations. First, each holding tank used in an application should generally and preferably be shaped with a large horizontal area relative to the height of the holding tank. Such a configuration will lower the work that must be done by the holding tank pump to return the fluid to the fluid body by reducing the elevation head across the pumping cycle.

Second, the holding tanks may, but need not necessarily be, open to atmospheric pressure. Such a configuration will allow the system to return to equilibrium with the exterior environment more easily, increases overall plant efficiency, and may avoid complications caused by pumping in a vacuum, such as the avoidance cavitation issues. For example, as shown in FIGS. 1-4, the top surface 40 of the first holding tank 8 can be either closed to create a sealed enclosure, or it can be open to the atmosphere. Alternatively, actuatable air valves can be contained within vents, such as at 42, in order to achieve the characteristics of having the holding tanks open to the atmosphere above the fluid body reservoir 4.

FIG. 1 depicts the power system 2 in a state in which the constant volumetric flow region 30 is shifted largely into the first power chamber 12. That is, the majority of the fluid volume defined by the first 26 and second 28 elastic boundaries is positioned within the first power chamber 12. The first holding tank 8 has just been filled with water. The first holding tank valve 32 has been closed, and the first holding tank pump 36 has commenced evacuation of the water back into the reservoir 4. The second holding tank 10 is empty and the second holding tank valve 34 is closed.

Figure 2:
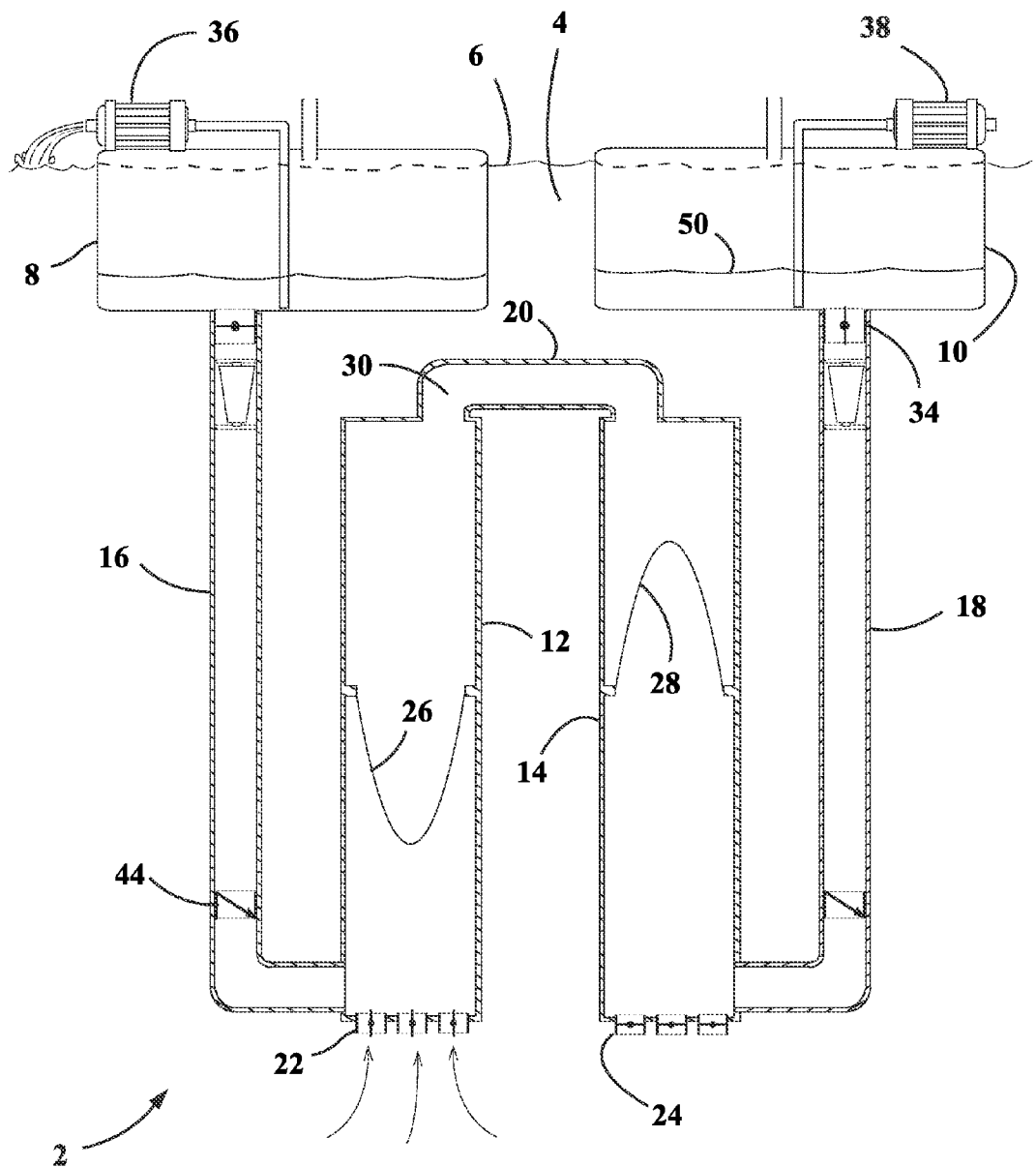
FIG. 2 depicts the embodiment shown in FIG. 1 at a further stage in the stroke.

Turning to FIG. 2, the first power chamber external valve 22 on the first power chamber 12 is opened, allowing higher-pressure water to flow into the first power chamber 12. It should be noted that efficiency might be increased by restricting flow between the first power chamber 12 and the first evacuation tube 16 just prior to and during the opening of the first power chamber external valve 22. Simultaneously or nearly simultaneous to the opening of the first power chamber external valve 22, the second holding tank valve 34 is opened. The empty second holding tank 10, which was recently emptied by the second holding tank pump 38, now experiences a pressure differential at the second holding tank valve 34 boundary. Consequently, the water in the power system 2 tends to flow in the direction of the second holding tank 10 in an attempt to return to equilibrium with the environment. The water level 50 begins to rise as water flows into the second holding tank 10 and will continue to rise until approximately even with the reservoir water level 6.

As the water flows into the first power chamber 12 from the reservoir 4, the volume of water in the lower portion of the first power chamber 12 increases, forcing the constant volumetric flow region 30 to shift towards the second power chamber 12 as the water in the lower portion of the second power chamber 12 flows into the second evacuation tube 18 and further into the second holding tank 10. During the filling process for the second holding tank 10, the first holding tank pump 36 can continue to evacuate the contents of the first holding tank 8 in isolation from the rest of the system 2. The second power chamber external valve 24 remains closed during this stroke of the cycle.

Figure 3:
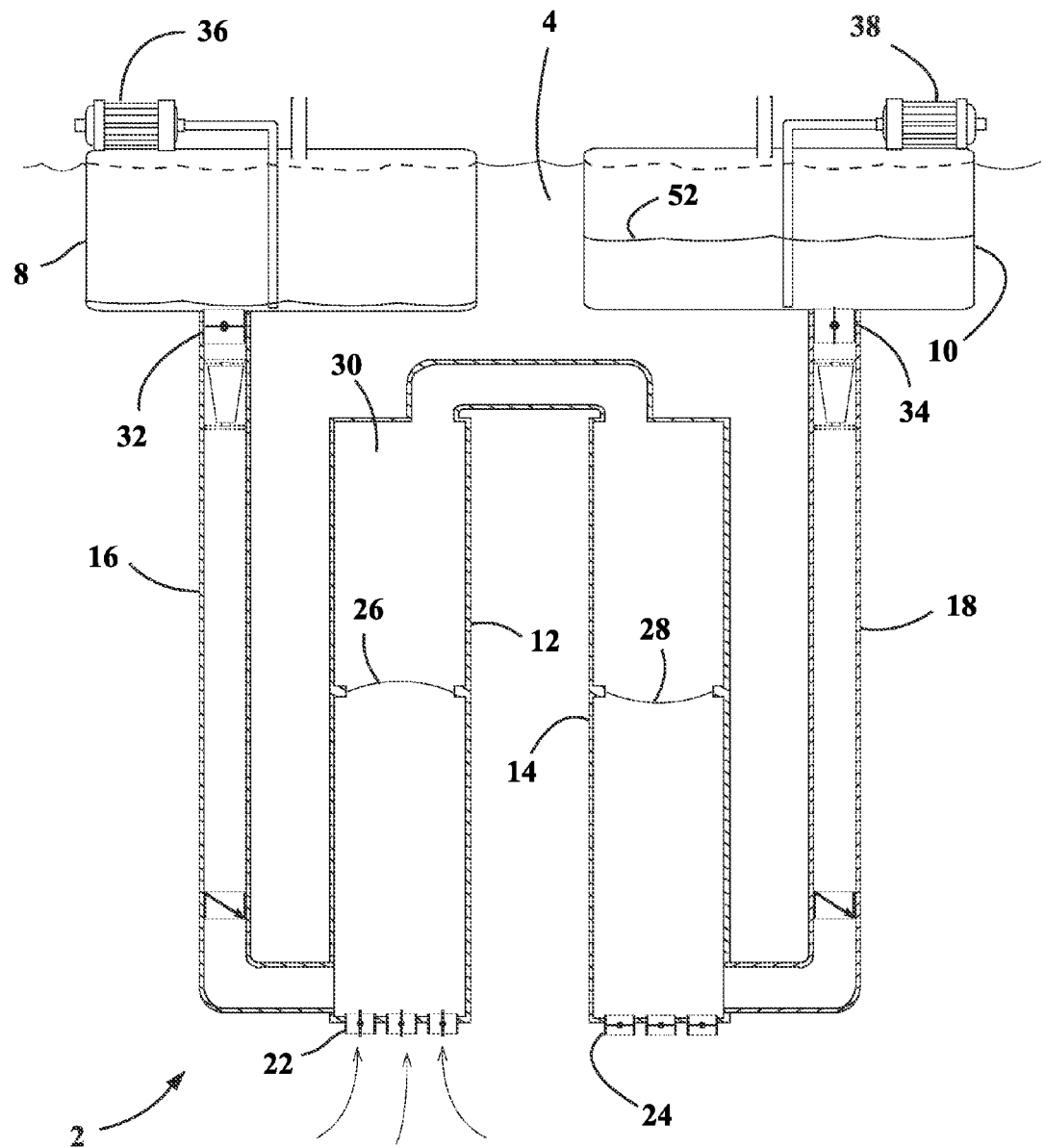
FIG. 3 depicts the embodiment shown in FIG. 1 at a yet further stage in the stroke.

Turning to FIG. 3, when the constant volumetric flow region 30 has shifted so that its contents are distributed roughly evenly between the first power chamber 12 and the second power chamber 14, the second holding tank 10 will be approximately halfway full, as shown by water level 52 in FIG. 3. The first power chamber external valve 22 and the second holding tank valve 34 remain open as water external to the system 2 flows into the first power chamber from the reservoir 4. The second power chamber external valve 24 and first holding tank valve 32 remain closed and do not allow water to flow. Alternatively, an evacuation tube door (not shown) would be closed leading to the first evacuation tube 16, while a second evacuation tube door (not shown) would be open leading to the second evacuation tube 18.

Figure 4:
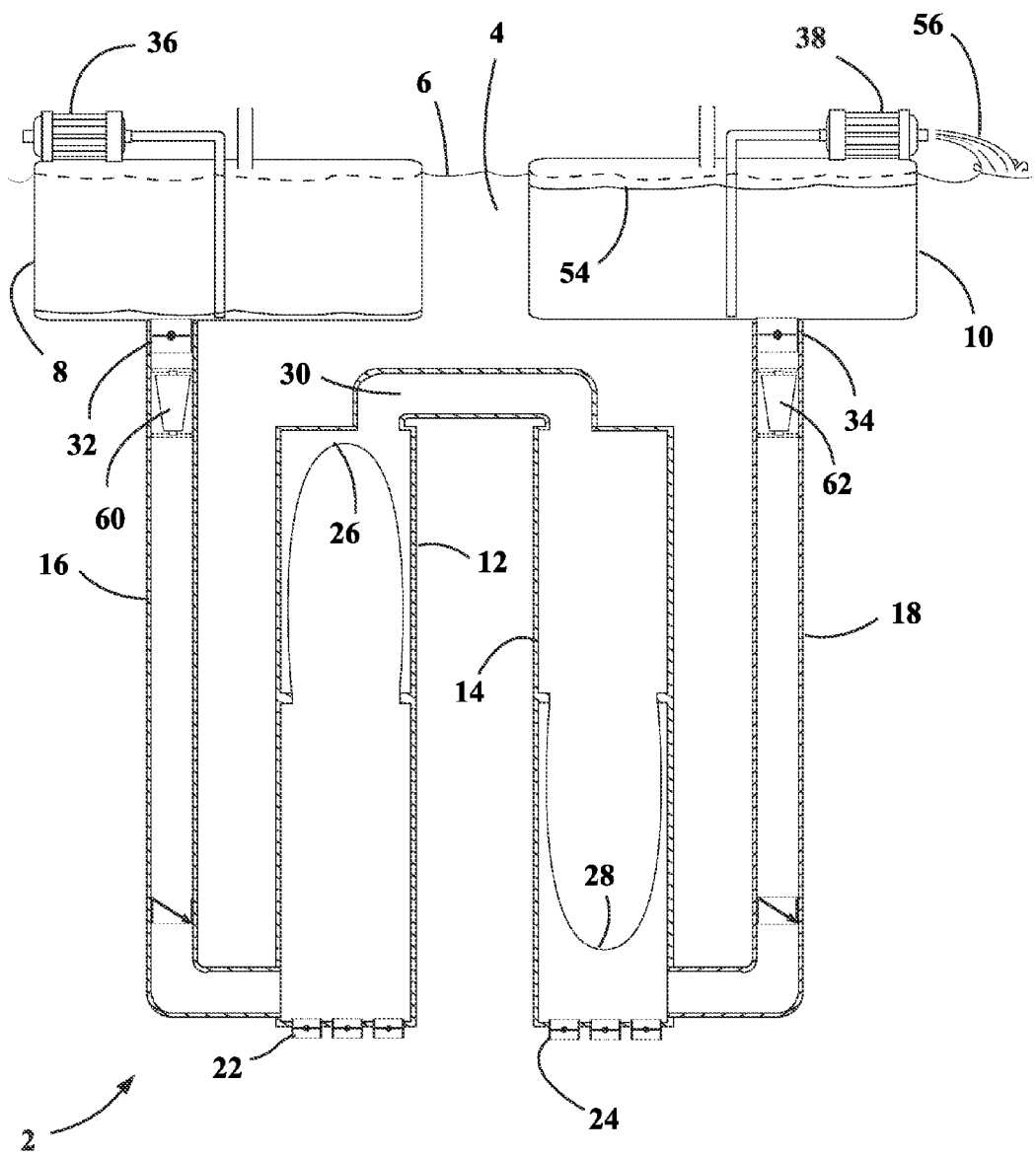
FIG. 4 depicts the embodiment shown in FIG. 1 at the end of the stroke.

Finally, the end of one stroke in the two-stroke cycle system 2 is depicted in FIG. 4. The second holding tank 10 has been filled or nearly filled so that its water level 54 is at or near the reservoir water level 6. The first power chamber external valve 22 and second holding tank valve 34 are closed, and the second holding tank pump 38 begins to evacuate the contents of the second holding tank 10. It should be noted that paddle-wheel type power units (not shown) may be placed within the exit stream 56 of the second holding tank pump 38 (and similarly for the first holding tank pump 36 during the second stroke) in order to provide a power source that does not restrict the internal flow of the system 2, thereby increasing the overall efficiency of the system 2.

At the end of the first stroke, the constant volumetric flow region 30 has shifted to reside mostly within the second power chamber 14 upper level, as shown by the expansion of the first 26 and second 28 elastic boundaries. Also at this point in the cycle, the evacuation of the first holding tank 8 should be complete, and the first holding tank pump 36 switched off. Water now rests at equilibrium pressures with respect to the external reservoir 4, filling the first 16 and second 18 evacuation tubes, the first 12 and second 14 power chambers, and the constant volumetric flow region 30. To begin the second stroke—a mirror image of the first—the second power chamber external valve 24 and first holding tank valve 32 are opened, similarly to the first power chamber external valve 22 and second holding tank valve 34 described in connection with FIG. 2. The opening of the first holding tank valve 32 will create a pressure gradient through the system 2 that is translated to the opening created by the actuation of the second power chamber external valve 24, thereby instigating the flow of water out of the first power chamber 12 and into the first holding tank 8.

Beginning with this basic proof-of-concept model, it should be noted that various flow energy converters, such as the first 60 and second 62 flow energy converters depicted in FIG. 4 (not labeled in FIGS. 1-3), may be placed within the system 2 such that the flow of water induced during a stroke is captured and converted into power, whether it be electric current, mechanical work, or the like. Therefore overall net efficiency of the system 2 shown in FIGS. 1-4 can thus be calculated by using the energy captured by flow energy conversion (e.g., with a water flow turbine of applicable type, as at 60 and 62), any additional power generation utilized at the exit stream (as at 56), and the energy input required to operate the first 36 and second 38 holding tank pumps.

Figure 5:
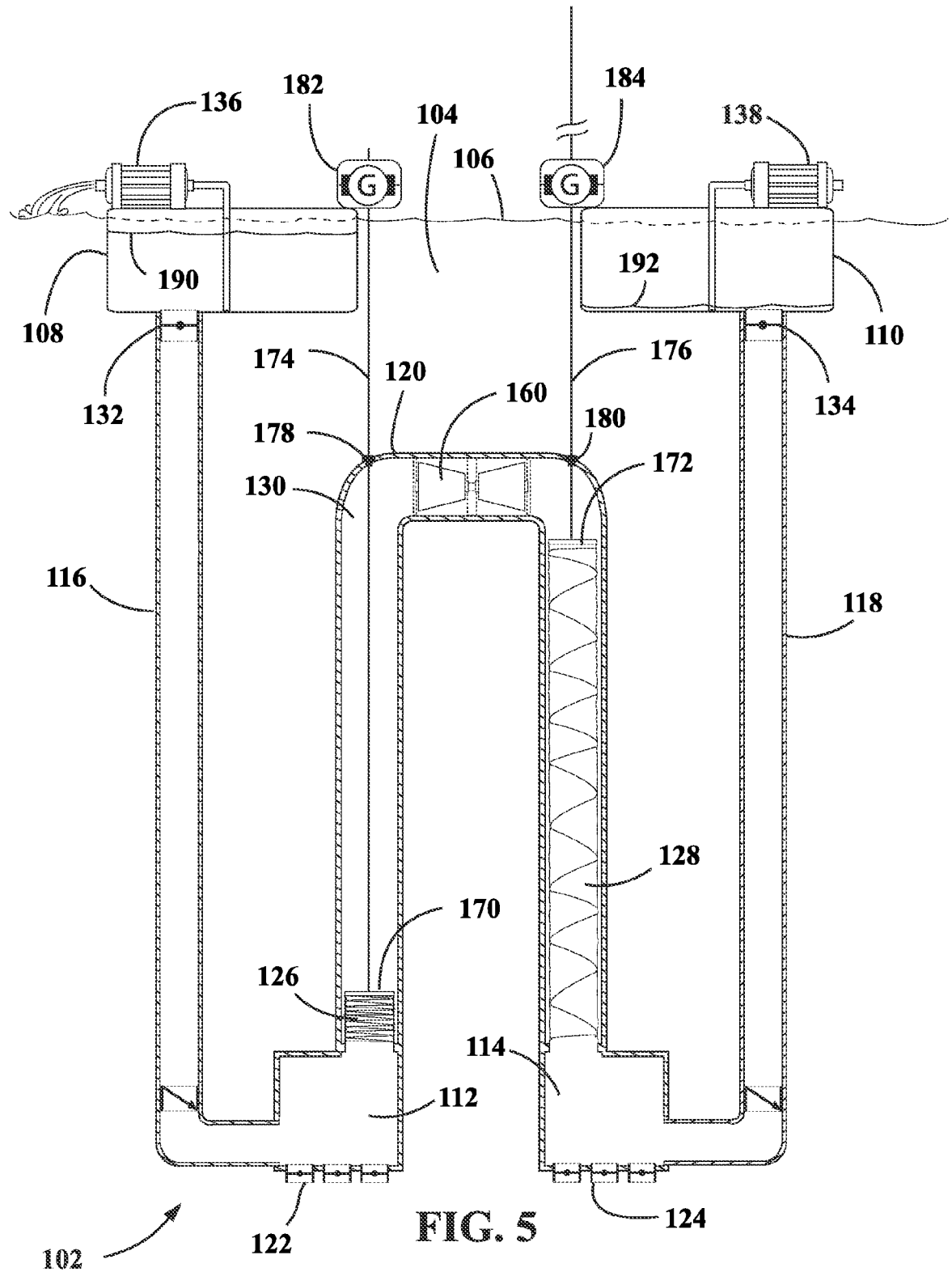
FIG. 5 depicts a second exemplary embodiment of the invention utilizing connecting rods and coil tubes to drive apparatus requiring work input, shown at the beginning of a stroke.
Figure 6:
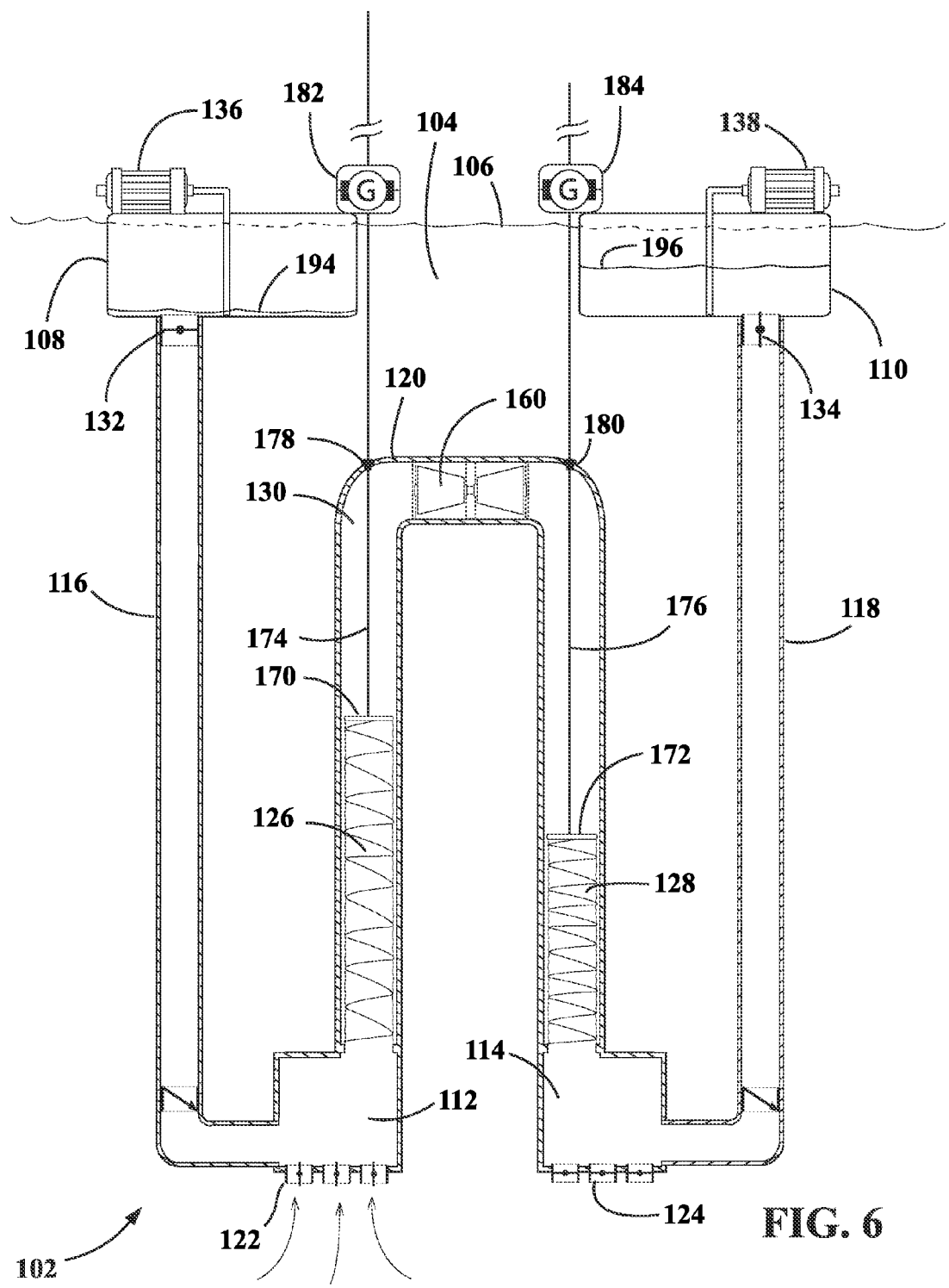
FIG. 6 depicts the embodiment shown in FIG. 5 at a further stage in the stroke.
Figure 7:
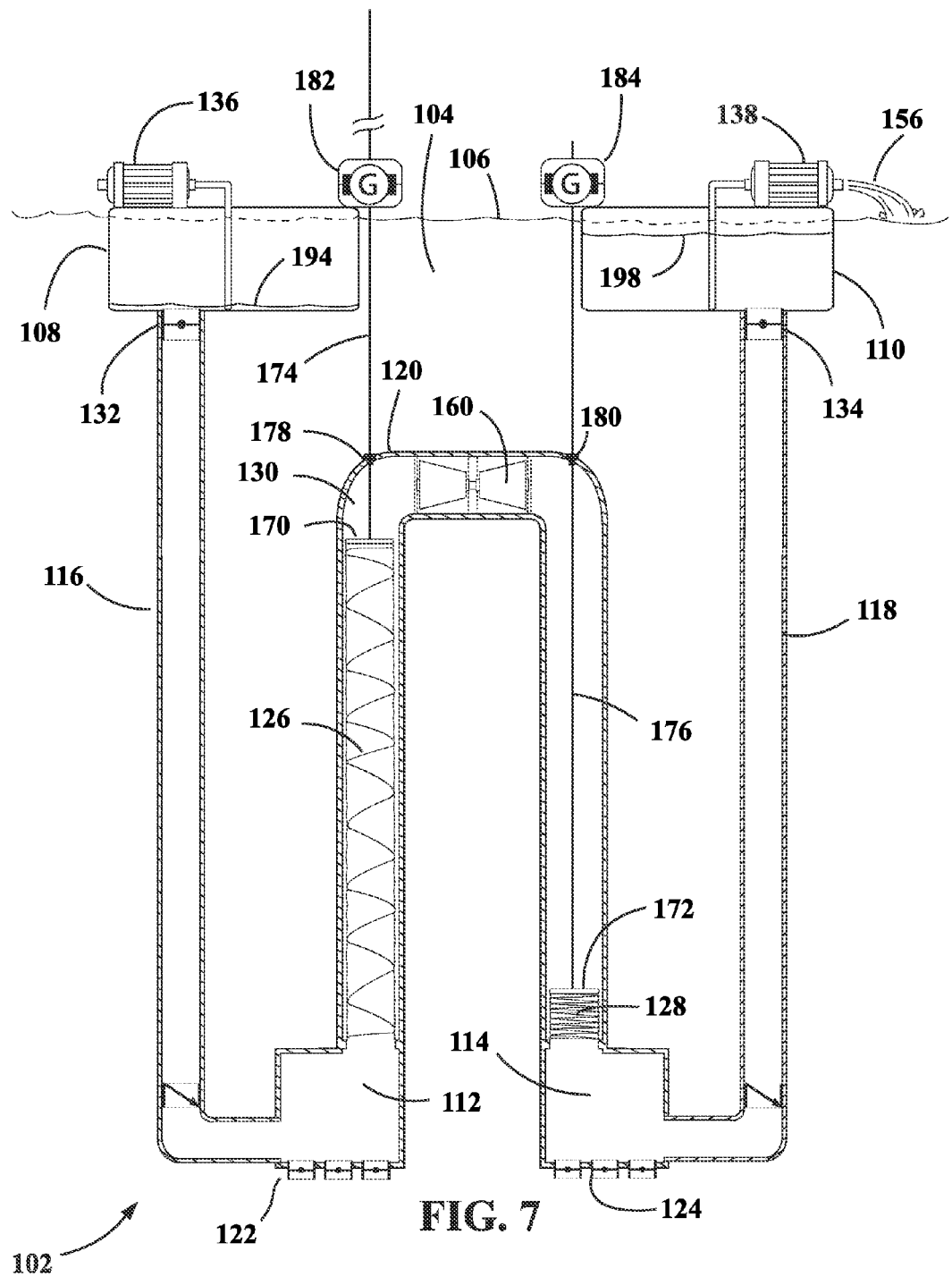
FIG. 7 depicts the embodiment shown in FIG. 5 at the end of the stroke.

Turning to FIGS. 5-7, a variation of the proof-of-concept model described in connection with FIGS. 1-4 is shown. Any optional features described in connection with FIGS. 1-4 and that are applicable to the embodiment shown in FIGS. 5-7 are considered optional features of the latter embodiment as well. Differences in their applications will be pointed out as necessary.

FIGS. 5-7 utilize a vertically elongate constant volumetric flow region to increase the travel distance of first 126 and second 128 coil tubes. Each coil tube is constructed of, for example, elastic or collapsible material encasing a collapsible spring-like structural frame. The expansion or contraction of the volume of water entering the first power chamber 112 will expand or contract the first coil tube 126, respectively, increasing or decreasing its overall length. The distal end of each coil tube is capped with a rigid plate: the first coil tube 126 is closed off with a first rigid plate 170, and the second coil tube 128 is capped off with a second rigid plate 172.

The first 126 and second 128 coil tubes inversely alternate between expanding and contracting as the constant volumetric flow region 130 is transferred back and forth between the first 112 and second 114 power chambers, in a manner similar to the alternating positioning of the first 26 and second 28 elastic boundaries depicted in FIGS. 1-4. As the coil tubes transition between their fully contracted (first coil tube 126 in FIG. 5) and fully expanded (second coil tube 128 in FIG. 5) states, the first 170 and second 172 rigid plates exhibit sinusoidal-type motion. By securing first 174 and second 176 connecting rods to the first 170 and second 172 rigid plates, respectively, the motion can be mechanically translated through the connecting rod 120 boundary with a gasket, as at 178 and 180.

The connecting rods can be attached to, for example, generators 182 and 184, and a generator axle or cam represented by two attachment points 182 and 184. The connecting rods can be generally be used to drive any apparatus that requires a work input, a crankshaft, mill, pump, or the like.

FIG. 5 depicts the beginning of a stroke in the two-stroke cycle. The first holding tank 108 is generally full of water and has been isolated from the rest of the system 102 as first holding tank valve 132 is closed. The first holding tank pump 136 has begun to evacuate the contents of the first holding tank 108, and will continue to do so during a portion of or up to the entire length of time for the stroke. The second holding tank 110 has been evacuated of its contents during the previous stroke by the second holding tank pump 138 and is ready to receive the water flowing into the system during the next stroke. Before the stroke begins, all valves restricting water flow are in the closed position, including the first 132 and second 134 holding tank valves and the first 122 and second 124 power chamber external valves.

The embodiment shown in FIGS. 5-7 is configured with an optional flow energy converter in the form of a reversible turbine 160, which can extract work from water flowing in both directions. By utilizing a reversible turbine placed in the flow stream in the connecting pipe 120, a single energy converter can be used to generator power.

Turning to FIG. 6, some time has passed since the first power chamber external valve 122 and the second holding tank valve 134 were opened. Water has begun to flow into the first power chamber 112 through the open first power chamber external valve 122 due to the empty second holding tank 110. The water in the system 102, again exposed to the ambient pressure gradient in the reservoir 104, begins to fill the second holding tank 110, as seen with water level 196 increased from the water level at the beginning of the stroke at 192 in FIG. 5. Water is in turn drawn up the evacuation tube 118 from the second power chamber 114, and consequently, the second coil tube 128 contracts as water is drawn from within. The contracting coil tube 128 carries the second rigid plate 172, which is attached to the second connecting rod 176. The movement of the connecting rod 176 can be used to perform work at the surface or below the apparatus if the connecting rods are inverted. The second connecting rod 176 can run, for example, a generator 184.

The contraction of the second coil tube 128 causes the constant volumetric flow region 130 to shift towards the second power chamber 114, causing water to flow through the optional reversible turbine 160. It should be noted that flow energy converters may be placed at various locations throughout the system in order to convert some of the flow energy into work external to the system. The size and amount of the flow energy converters may reduce the speed of a particular stroke, however, depending on the particular application.

The shifting constant volumetric flow region 130 draws the first coil tube 126 and the first rigid plate 170 upwards, driving the first connecting rod in the opposite direction of the second connecting rod 176. Similarly, the movement of the first connecting rod 174 can be used to perform work external to the system, in conjunction with, or independently of, the second connecting rod 176.

Finally, the expanding first coil tube 126 draws water into the first power chamber 112 through the first power chamber external valve 122, which can be configured as an array of valves, or as a single valve. As in FIGS. 1-4, it is referred to as a valve in the singular sense without limitation as to the amount of actual valves involved in a particular application. Many smaller, quick moving valves may be preferable over one or two large area valves, or vise versa.

FIG. 7 depicts the end of the stroke, wherein the second holding tank 110 has been completely or nearly completely filled with water, as shown by the water level 198 in FIG. 7. The first power chamber external valve 122 and second holding tank valve 134 are closed upon the filling of the second holding tank 110, and the second holding tank pump 138 is activated in order to drain the holding tank's contents. Note that the first holding tank pump 136 has completed draining the water from the first holding tank 108 as shown by water level 194. The second coil tube 128 has expelled its volume of water in the direction of the second holding tank 110 and is fully compressed. The first coil tube 126 is likewise fully expanded. To begin the next stroke, the second power chamber external valve 124 and the first holding tank valve 132 will be opened and the stroke will mirror the previously described stroke, completing a cycle.

At the transition between strokes there is no water flow through the connecting pipe 120, and any optional flow energy converters such as the reversible turbine 160 housed in the connecting pipe 120 cease producing power. Also, the first rigid plate 170 has reached its vertical apex, while the second rigid plate 172 has reached its vertical floor.

A third embodiment of the apparatus depicted in FIGS. 8-11 utilizes pontoons contained within pontoon chambers to enhance and augment the power derived from the water flowing through the system 202. For relatively little power investment, the pontoons enable the system 102 to greatly augment the work performed by the connecting rods external to the 102.

Figure 8:
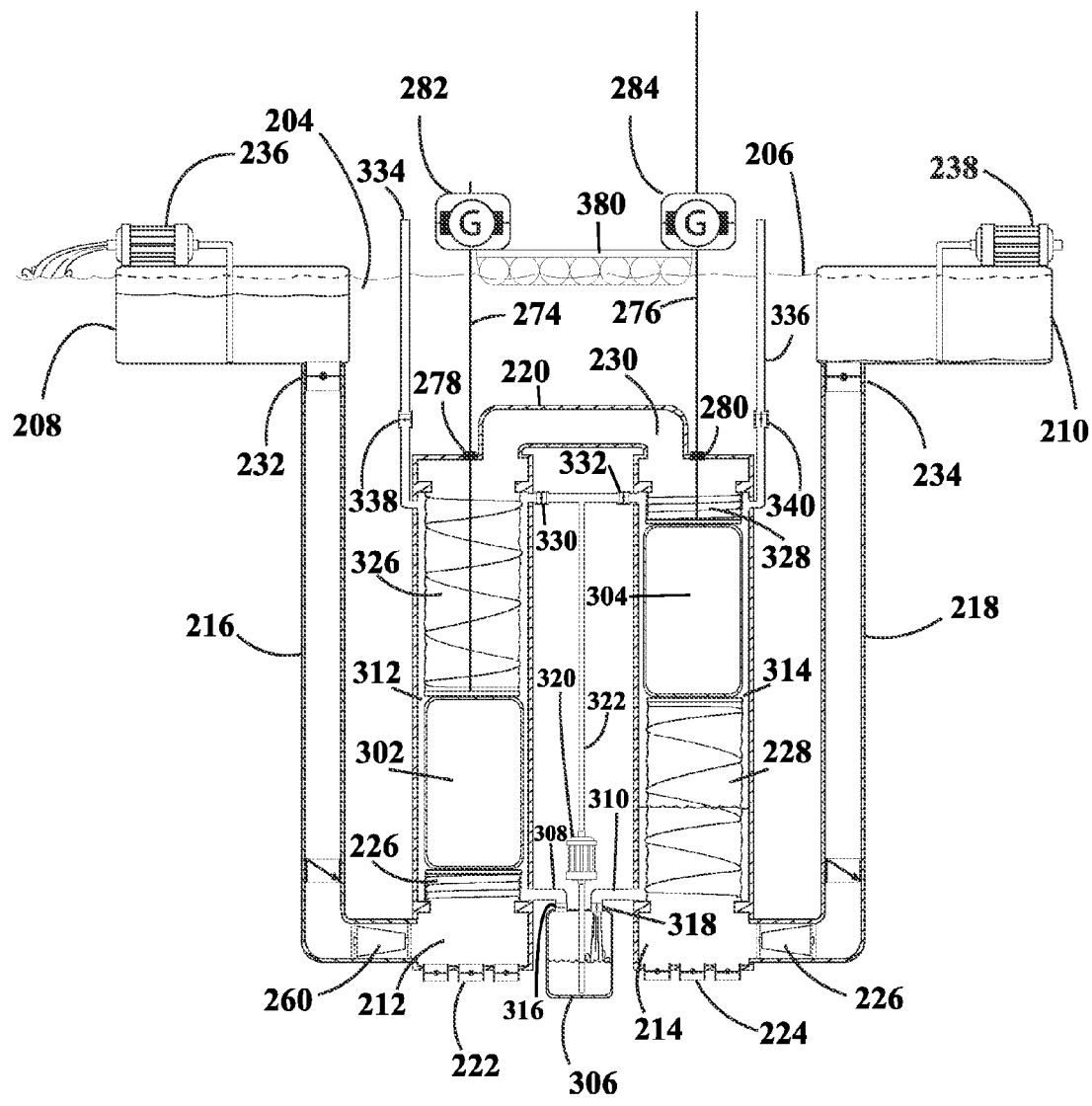
FIG. 8 depicts a third exemplary embodiment of the invention utilizing pontoons to enhance the power generated by the system, shown at the beginning of a stroke.

FIG. 8 depicts an arrangement similar to that shown in FIGS. 5-7, but with modifications to the regions between the first 216 and second 218 evacuation tubes. The movable extremes of the constant volumetric flow region 230 are rigid plates affixed to and capping the end of a first 326 and second 328 upper pontoon chamber coil tube. As the constant volumetric flow region shifts from one pontoon chamber to the other, the first 326 and second 328 upper pontoon chamber coil tubes alternate in their expansion and contraction, maintaining a constant volume of water within the coil tubes and connecting pipe 220. As in FIGS. 5-7, the first 212 and second 214 power chambers can also volumetrically expand via a first 226 and second 228 lower pontoon chamber coil tube as water enters through their respective first 222 and second 224 power chamber external valves.

First 274 and second 276 connecting rods pass through gaskets 278 and 280 and are connected to an external device requiring power input. The external device can be, for example, generators 282 and 284 positioned on platform 380 as shown in FIGS. 8-11, a large pump, or the like. The movement of the rigid plates that are connected to the first 326 and second 328 upper pontoon chamber coil tubes drives the connecting rods.

A first pontoon 302 is positioned between the first upper 326 and lower 226 pontoon chamber coil tubes. A second pontoon 304 is positioned between the second upper 328 and lower 228 pontoon chamber coil tubes. Each of the first 302 and second 304 pontoons is contained within a first 312 and second 314 pontoon chamber, respectively. The first pontoon chamber 312 is vented to atmospheric pressure via a first pontoon chamber air vent 334 and is actuatable through a first pontoon chamber air vent valve 338. The second pontoon chamber 314 is vented to atmospheric pressure via a second pontoon chamber air vent 336 that is likewise actuatable through a second pontoon chamber air vent valve 340.

When the pontoons are configured to be filled with air, the air vents allow the pontoon chambers to be filled with air at atmospheric pressure, which surrounds the pontoons. On a down stroke, in which a pontoon moves from its vertical apex in the cycle to its vertical floor, the encapsulation of the pontoon with air reduces or negates the buoyant forces acting upon the pontoon. This effect makes the energy required to return the pontoon to its position at the bottom of the pontoon chamber relatively small compared to the energy increase achieved through the use of pontoons on the upstroke.

Alternatively, the pontoons can be filled with the liquid that fills the fluid reservoir 204, or other solution, fluid or gas. In the case of water, filling the pontoons with water will allow for the effect of neutral buoyancy to greatly assist in returning the pontoons to their vertical apex during a cycle. In this configuration, the pontoons will augment the power generated by the system during the down stroke, when the pontoon's individual weight will contribute additive force to the connecting rod.

In the examples and illustrations that follow, the pontoon systems are filled with air unless otherwise specified. The use of air need not be limiting, however, as will be evident with further explanation. Air- and water-filled pontoons are used for illustrative simplicity, but any material can be used to create the structure of the pontoons. The pontoons can be hollow, solid, or semi-permeable, because it is the buoyant relationship between the pontoon body (whether filled, empty, or solid) and the liquid, gas, or combination of both, that provides the system with its ability to do work at low energy input levels. For example, in addition to a hollow pontoon filled with air, water, or nothing, the pontoon could be made out of (or filled with) wood (e.g., balsa wood), cork, metal, plastic, Styrofoam or any other material that is suitable for a particular application. Once the principles of the current invention are understood, those skilled in the art employing these teachings will be able to select such appropriate materials without undue experimentation or further invention.

In the embodiment shown in FIGS. 8-11, the pontoons are assumed to be filled with air. Other configurations are of course possible, and their method of operation will become evident after reading this disclosure. While the pontoon chamber air vents enable the pontoon chambers to be filled with air, the pontoon chamber filling pipe 322 connects to a pontoon chamber filling pump 320. The pump 320 is connected to both a first 330 and second 332 pontoon chamber filling pipe valve, which are used to control into which pontoon chamber the pump 322 pumps. A first 308 and second 310 pontoon chamber drain pipe and a first 316 and second 318 drain pipe valve allow water to be drained from the first 312 and second 314 pontoon chambers, respectively, when neutral buoyancy with an air pontoon is desired. A pontoon chamber reservoir 306 is used to store the pontoon chamber water when not in use. The pontoon chamber water is relatively and preferably quite small when compared to the volumes present in other elements of the apparatus. The pontoon chamber filling pump 320 draws water from the pontoon chamber reservoir 306 as needed to return water to a pontoon chamber.

FIG. 8 depicts the beginning of a stroke for the two-stroke cycle. The holding tank valves 232 and 234 are closed, as well as the power chamber external valves 222 and 224. The first holding tank 208 is full or nearly full, and the first holding tank pump 236 has begun to evacuate the contents of the tank. The first pontoon 302 rests at its lowest point, with the first lower pontoon chamber coil tube 226 fully contracted and the first upper pontoon chamber coil tube 326 fully extended. Likewise, the second lower pontoon chamber coil tube 228 is fully extended and the second upper pontoon chamber coil tube 328 is fully contracted. The constant volumetric flow region 230 is shifted towards the first power chamber 212 relative to the second power chamber 214.

The first pontoon chamber 312 is filled with water, and the first pontoon chamber air vent valve 338, filling pipe valve 330, and drain pipe valve 316 are all closed. The second pontoon chamber drain pipe valve 318 is open, and the water has begun to drain out of the second pontoon chamber 314 and into the pontoon chamber reservoir 306.

Figure 9:
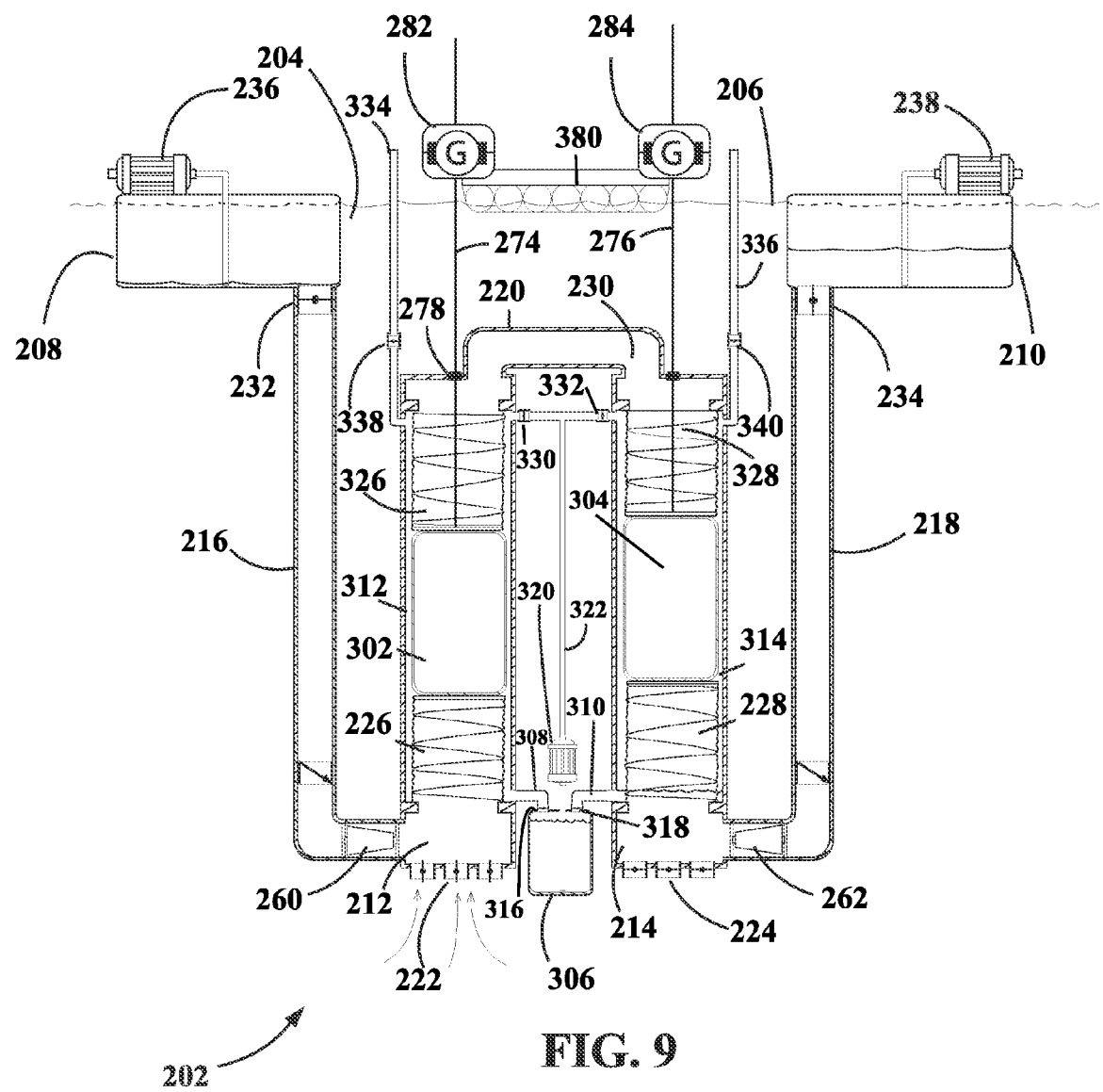
FIG. 9 depicts the embodiment shown in FIG. 8 at a further stage in the stroke.

Turning to FIG. 9, a state of the system 202 is shown at a time during the stroke beginning in FIG. 8. The first power chamber external valve 222 and the second holding tank valve 234 are open and water from the fluid reservoir 204 has begun to flow into the first power chamber 212. The first lower pontoon chamber coil tube 226 has expanded from its fully retracted state (shown in FIG. 8), and the first upper pontoon chamber coil tube 326 has retracted from its fully extended state (also shown in FIG. 8) as the constant volumetric flow region 230 has shifted toward the second power chamber 214. Likewise, the second upper pontoon chamber coil tube 328 has expanded and the second lower pontoon chamber coil tube 228 has retracted from the state shown in FIG. 8. Seeking equilibrium with the fluid reservoir 204 fluid level 206, fluid with the system 202 has begun to fill the second holding tank 210 via the second evacuation tube 218.

The water surrounding the second pontoon 304 has been fully drained from the second pontoon chamber 314 into the pontoon chamber reservoir 306, thereby negating buoyant forces that would resist the downward movement of the second pontoon 304. The first 316 and second 318 drain pipe valves and the first 330 and second 332 pontoon chamber filling pipe valves are all closed in this state. The first pontoon 302 is in upwards motion and the second pontoon 304 is in downwards motion. The upward motion of the first pontoon 302 is used to operate a device requiring work input. The device could be, for instance, one or more power generators such as 282 and 284, or other mechanical devices such as crankshafts, pumps, mills and the like. The connecting rod system enables the motion of the pontoons and constant volumetric region to mechanically perform work as desired using, for instance, first 274 and second 276 connecting rods.

Figure 10:
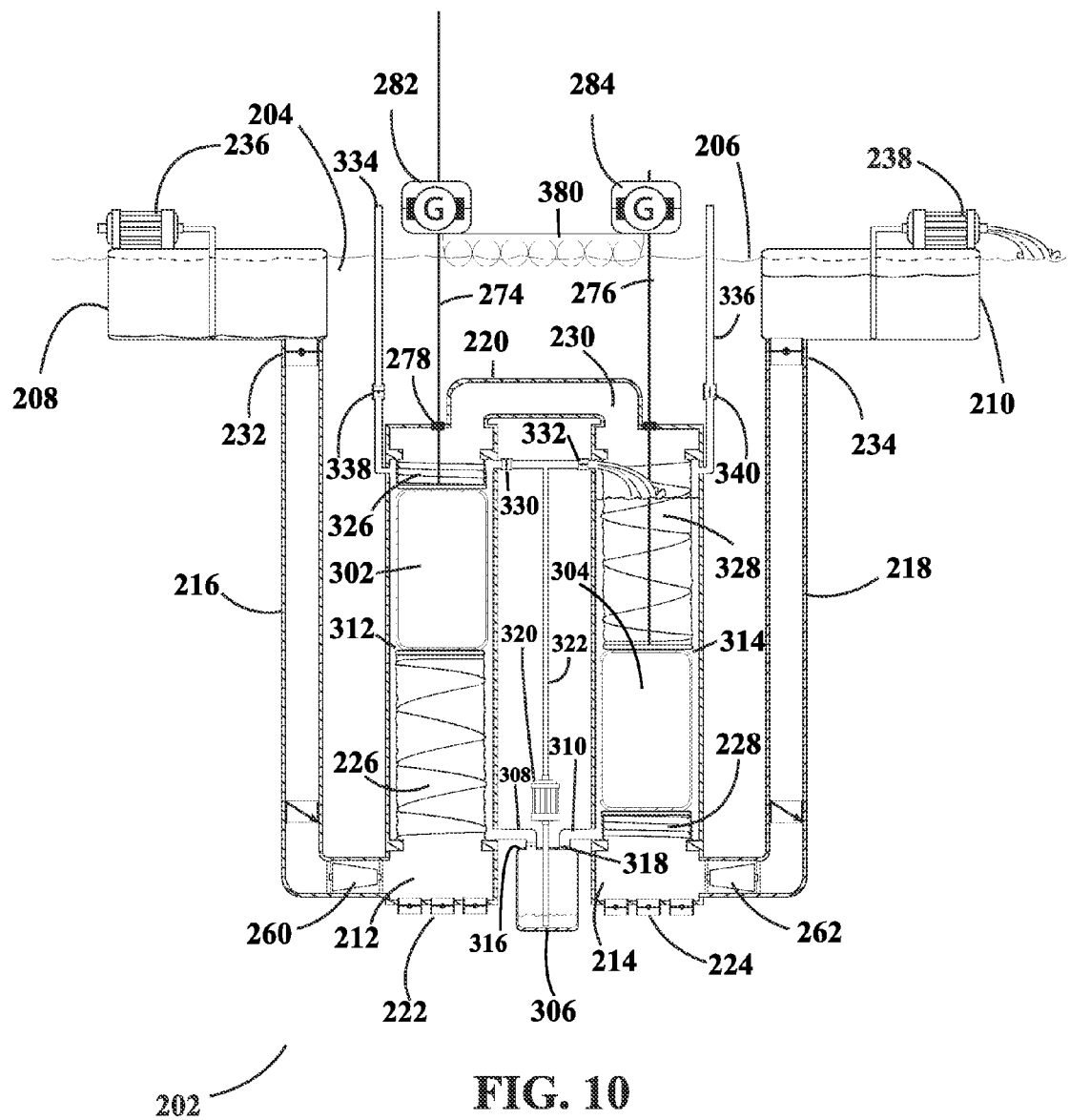
FIG. 10 depicts the embodiment shown in FIG. 8 at the end of the stroke.

FIG. 10 depicts the end state of the stroke begun in FIG. 8. In this state, the first pontoon 302 has traveled to its vertical apex and the second pontoon 304 to its vertical floor. The first upper pontoon chamber coil tube 326 and the second lower pontoon chamber coil tube 228 are fully retracted, and the first lower pontoon chamber coil tube 226 and the second upper pontoon chamber coil tube 328 are fully extended. The first power chamber external valve 222 and second holding tank valve 234 have been closed. The second holding tank 210 is now full, or nearly full, and is isolated from the rest of the system 202. The second holding tank pump 238 has begun to return the fluid in the second holding tank 210 to the fluid reservoir 204.

At or near the end of the stroke, the pontoon chamber filling pump 320 begins to refill the second pontoon chamber 314 to prepare for the next stroke, wherein the second pontoon 304 will move upwards in its power stroke. The second pontoon chamber filling pipe valve 332 has been opened to allow the fluid in the pontoon chamber reservoir 306 to be pumped into the second pontoon chamber 314.

Figure 11:
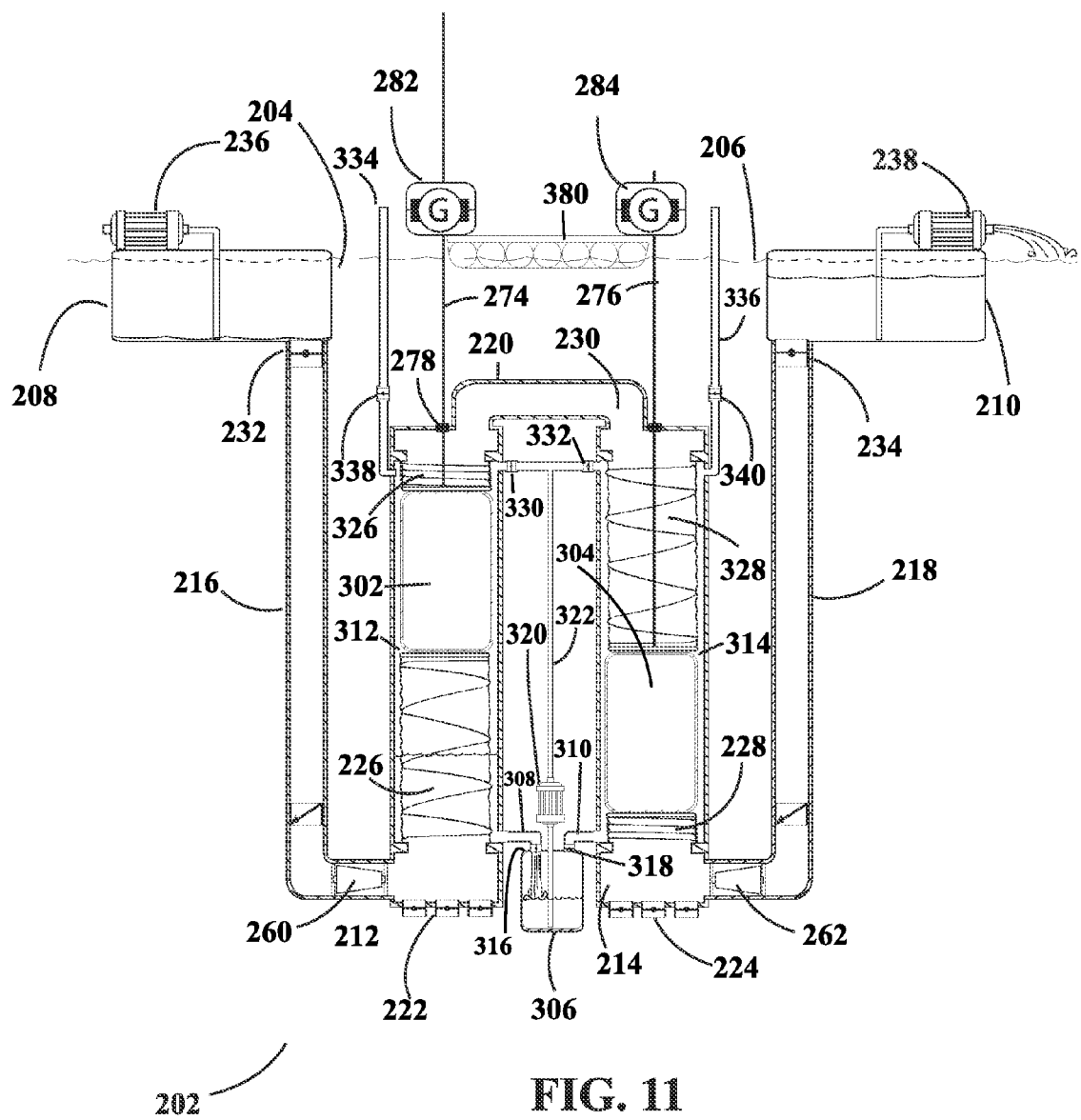
FIG. 11 depicts the embodiment shown in FIG. 8 at a transition state between the stroke transitioned as shown in FIGS. 8-10 and the beginning of a reciprocating stroke.

FIG. 11 depicts a state just before the beginning of the next stroke. The second pontoon chamber 314 has been refilled by the pontoon chamber filling pump 320 and the second pontoon chamber filling pipe valve 332 closed. The first drain pipe valve 316 has been opened and the fluid in the first pontoon chamber 312 is nearly fully drained in preparation of the first pontoon 302 returning back to its vertical floor as shown in FIG. 8. At the start of the next stroke, the second power chamber external valve 224 and the first holding tank valve 323 will be opened, and the first drain pipe valve 316 will be closed. These reciprocating strokes described herein will continue cycling as described, generating work for power generation or the like.

The movement of the pontoons can be used to operate a generator system that produces electricity. The water entering the power plant and the water being evacuated by the plant's pumping systems cause the pontoons to move. The water entering the power plant also is used to pressurize the water in the power plant to equal or nearly equal the adjacent outside water pressure at the point of discharge. Since the water being evacuated is equal or nearly equal to the water it is being evacuated into, the pumping system's required work expenditure becomes diminished. Therefore, if the head of the water entering the power plant is 100 feet and the water being evacuated has had its pressure equalized or nearly equalized with the outside ocean water at the point of discharge, then it will only take a few psi to evacuate the water from the power plant, compared with having to discharge water at atmospheric pressure into water pressure that is much higher at the point of discharge.

The term "return station" refers to a portion of the return system that evacuates the material from its respective power or pontoon chamber, generally beginning at the distal end of an evacuation tube (i.e., furthest from its connection point with the power chamber). A "return system" generally carries out the task of evacuating the material exiting its respective power chamber (either during or after the emptying process of the pontoon chamber, or some combination of both). Any given return system can be made up of multiple return stations, which are individual pumping systems (e.g., holding tank and holding tank pump) contained within a return system. It should be evident to the skilled artisan that the variations shown in connection with these figures may be applied in conjunction with the multitude of applications and examples disclosed previously herein. While employing the variations that follow offer alternative to the operative sequences of the systems and allow for power generation at greater rates, the basic principles remain the same—natural pressure differentials are being used to reduce the workload needed to evacuate the system of material, while simultaneously using the material flow to generate power. If there are multiple return stations connected to each power chamber, and they alternate evacuating the appropriate amount of water from their respective power chambers, then each return station will have more time to evacuate its water contents after being isolated from the pontoon chamber assembly. The time savings result because as one return station evacuates its water content from its holding chamber, the others are receiving the working fluid of subsequent strokes that is expelled from the corresponding power chamber in alternating sequence. This also allows the power plant to run continuously, and at an added energy savings due to the reduced flow rate requirements.

Figure 12:
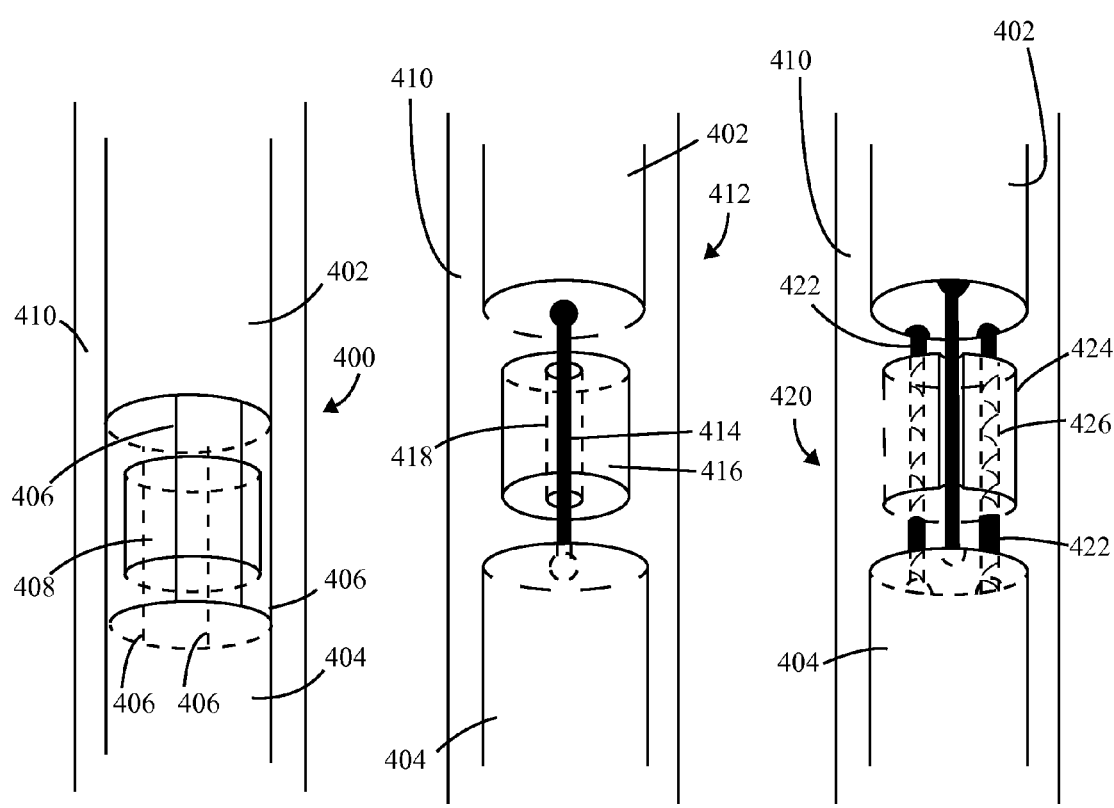
FIGS. 12A-C depict perspective views of three exemplary embodiments of a pontoon cradle.

Note that, in applications utilizing the buoyancy effects of a pontoon, it is helpful to permit the working fluid to contact the horizontal surfaces of the pontoon for maximum efficacy, but also that it is desirable to also allow the pressure gradients experienced throughout the system to be translated from the power chambers to the constant volumetric region. Turning to FIGS. 12A-C, several exemplary embodiments of cradle systems are illustrated that can optionally be used to operatively connect the power chambers and constant volumetric flow region, while maximizing potential buoyant forces acting on the pontoons. FIG. 12A is perspective view of a cage-type cradle system 400, wherein a cradle frame binds the upper 402 and lower 404 pontoon chamber coil tubes with a plurality of supports 406 spaced generally circumferentially around the periphery of and extending between the ends of the coil tubes 402 and 404. The cradle system 400 encapsulates a pontoon 408 in the space between the coil tubes 402 and 404 thereby creating space for the pontoon to experience buoyant forces acting on its horizontal surface(s) due to the working fluid from the pontoon chamber 410.

Alternatively, FIG. 12B depicts a perspective view of a second exemplary embodiment of a cradle system of a through-hole type 412. In this embodiment, the upper 402 and lower 404 coil tubes may be connected via one or more supports 414 that pass through the interior of the pontoon 416 that includes one or more through-holes 418 or alternatively gasket/linear bearing configurations. The through-hole type of cradle system 412 also permits the pontoon 416 to float between the ends of the coil tubes 402 and 404 to maximize the availability of buoyant forces from the working fluid in the pontoon chamber 410.

A third exemplary embodiment of a cradle system is shown in perspective view in FIG. 12C. This cradle system demonstrates an exterior groove or guide-type configuration 420 that utilizes a plurality of supports 422 spaced generally circumferentially around the periphery of and extending between the ends of the upper 402 and lower 404 coil tubes in a similar manner to that shown in connection with FIG. 12A, except that the exterior of the pontoon 424 contains a series of longitudinally extending grooves or guides 426 oriented to receive the supports 422. The pontoon 424 is generally provided with a vertical range of motion, differing from FIG. 12A which may be employed with lateral clearance around the pontoon or with similar restrictions on lateral movement. The vertical range of motion afforded by the guide-type configuration 420 similarly permits buoyant forces resulting from the working fluid in the pontoon chamber 410 to act on the pontoon 424. It will be clear to those skilled in the art that the use of a particular cradle system, or of a cradle system in general, will depend upon the specific use of the various subsystems described in further detail below.

In the descriptions that follow, many of the exemplary embodiments have portions of identical operability or system components, or may be similar to those of other embodiments such that those skilled in the art will recognize their function. For simplification and readability, differences between the embodiments and novel features thereof will be discussed with particularity, but operations or system elements for which description would be duplicative or repetitive will be avoided where possible, and reference should be made to other figures in which a particular component or subsystem is described.

Furthermore, unless otherwise noted in the description relating to a specific figure, for any system component described below in which a space is emptied or filled with working fluid during the operation of the plant, it will be assumed that those skilled in the art will appreciate that vents to atmospheric pressure may be utilized for safe and efficient operation of the plant. Air vents and their connections will be collectively referenced using the numeral 430 hereinafter for all figures. Additionally, both separate and combined (e.g., switched/actuatable) air vents with respect to discrete system components are shown (e.g., a first and second pontoon chamber), but any physical configuration that is suitable for a given application will be selected by those skilled in the art according to known methods and specific design considerations and parameters, and therefore should not be seen as limiting. For example, the use of always open vents for certain components may reduce construction costs in some circumstances, while the use of actuatable vents may be desirable in others. Note also that in some of the embodiments that follow, it should be clear to those skilled in the art that air vent connections are occasionally not shown to increase the clarity of a figure, and in those circumstances are implied.

Figure 13:
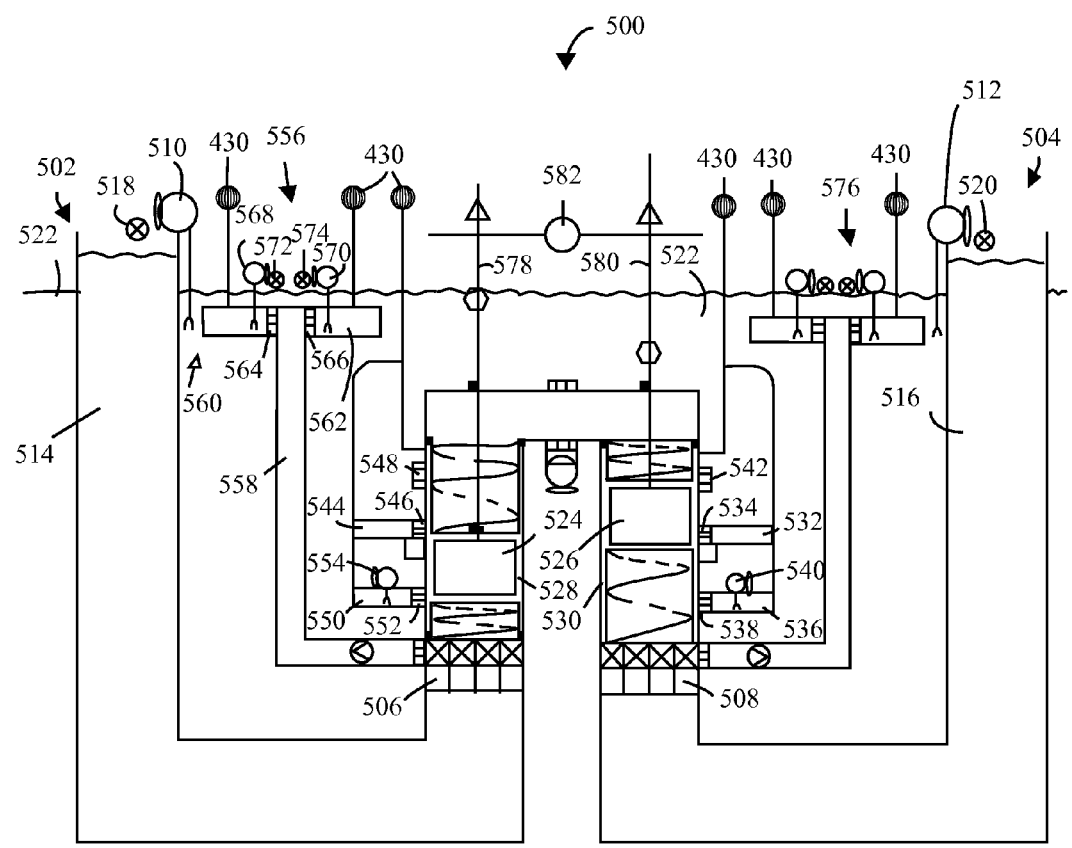
FIG. 13 depicts a fourth exemplary embodiment employing an artificial head system and a further exemplary embodiment of a means for reciprocally draining and filling a pontoon chamber.

FIG. 13 depicts an exemplary embodiment utilizing pontoons as the primary force-producing means (e.g., similar to the embodiment described in connection with FIGS. 8-11) and also employing an artificial head system and a further exemplary embodiment of a means for reciprocally draining and filling a pontoon chamber. The use of an optional artificial head system is suitable for many plant designs, and the plant 500 shown in FIG. 13 illustrates the use of a first 502 and second 504 artificial head system corresponding to the first 506 and second 508 power chamber external valves, respectively. The first 502 and 504 artificial head systems include first 510 and second 512 artificial head system pumps, and first 514 and second 516 artificial head chambers, respectively. Optional first 518 and second 520 auxiliary turbine generators may be placed in the outlet stream of the first 510 and second 512 artificial head system pumps, respectively, in order to recapture some of the energy cost of the pumping done by the pumps 510 and 512.

The artificial head systems 502 and 504 pump working fluid from the reservoir 522 to a higher head in the respective first 514 and second 516 artificial head chambers, thereby achieving a higher pressure experienced at the first 506 and second 508 power chamber external valves with respect to their actual depth in the reservoir 522. An artificial head system may be employed on any application wherein a greater pressure differential between the main system inlets and outlets is desired.

The plant 500 shown in FIG. 13 also illustrates a further embodiment of the means for reciprocally draining and filling a pontoon chamber—an operation that is desired when pontoons (e.g., first 524 and second 526 pontoons) are used to exert buoyant forces and perform work. In this depiction, the first pontoon 524 is at the bottom of the first pontoon chamber 528, and the second pontoon 526 is at the top of the second pontoon chamber 530. The first pontoon chamber 528 should thus be refilled with the working fluid to restore or increase the buoyant forces acting on the first pontoon 524, and the second pontoon chamber 530 drained of the working fluid to reduce or remove the buoyancy of the second pontoon 526, for reasons similar to those described above in connection with FIGS. 8-11.

The buoyancy nullification and restoration process can be accomplished in the following exemplary manner. Working fluid is drained from the upper portion of the second pontoon chamber 530 into the second middle pontoon chamber compartment 532 by opening valve 534 and allowing gravity to partially drain the second pontoon chamber 530. The second middle pontoon chamber compartment valve 534 is closed, and the process is repeated at the second lower pontoon chamber compartment 536 and corresponding valve 538, after which valve 538 is also closed and the pontoon chamber 530 has been sufficiently drained to negate the buoyancy of the second pontoon 526. The working fluid contained within the second lower pontoon chamber compartment 536 may then, for instance, be pumped into the outside head of the reservoir 522 via pump 540, or later returned through a connection (not shown) with the second upper pontoon chamber compartment valve 542.

To restore the operation of buoyant forces on the first pontoon 524, the working fluid must be returned to the first pontoon chamber 528. From a previous stroke, the first middle pontoon chamber compartment 544 is filled. Valve 546 is opened and the water in the first middle pontoon chamber compartment 544 is returned to the first pontoon chamber 528 via gravity. The first middle pontoon chamber compartment valve 546 is then closed, and the first upper pontoon chamber compartment valve 548 is opened to allow working fluid from the reservoir 522 to flow from a higher head into the first pontoon chamber 528 until it is filled, at which point the valve 548 is closed. Alternatively, if the working fluid previously drained into the first lower pontoon chamber compartment 550 via valve 552 has not been returned to the reservoir by pump 554, is can be pumped up from the lower compartment 550 to the upper valve 548 to fill the chamber 528. Other similar variations will be evident to those skilled in art in light of this disclosure, and the arrangement and manner of performing the draining and refilling should not be considered limiting.

Furthermore, FIG. 13 illustrates the use of multiple return stations per return system, as described generally above. The first return system 556 includes a first evacuation tube 558 and a first 560 and second 562 return station. The first 560 and second 562 return stations are selected for filling, respectively, via first 564 and second 566 return station valves, allowing them to alternate filling and emptying processes during plant operation. Pumps 568 and 570 and corresponding auxiliary turbines 572 and 574 are shown for the return stations as well. The plant 500 exhibits a mirror image return station 576 with corresponding components for the second power chamber as well. Other notable features of the plant 500 include connecting rods 578 and 580 coupled to a generator, machine or the like 582.

Figure 14:
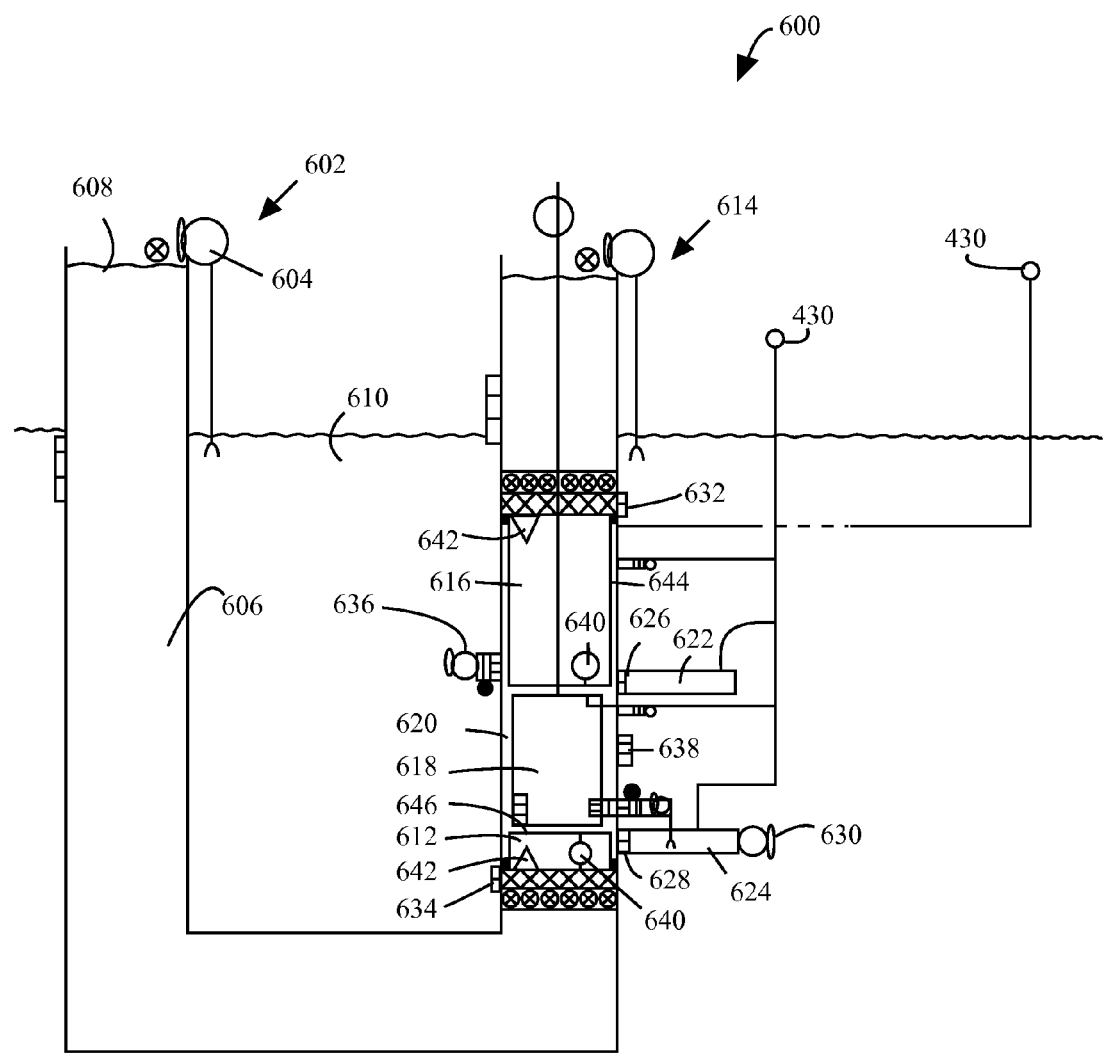
FIG. 14 depicts a fifth exemplary embodiment employing a single pontoon chamber system.

The use of an artificial head system as described above can be utilized to generate sufficient pressure at the power chamber valves so that the working fluid can be evacuated from the plant without a connecting pipe/constant volumetric region and thus using only a single pontoon. An exemplary embodiment is depicted in FIG. 14, and also shows the option of foregoing the use of return stations to remove working fluid from the system. The plant 600 employs a first artificial head system 602 that includes an artificial head system pump 604 and an artificial head chamber 606 wherein an artificial head working fluid level 608 is maintained above the head of the reservoir 610 for the lower power chamber 612. Similarly, a second artificial head system 614 is provided for the upper power chamber 616. A single pontoon 618 is found within the pontoon chamber 620. The plant 600 is provided with upper 622 and lower 624 pontoon chamber compartments with associated valves 626 and 628, respectively, for draining the working fluid from the pontoon chamber 620. The lower pontoon chamber compartment pump 630 returns the working fluid from the lower pontoon chamber compartment 624 to the reservoir 610 head. The outlet of the upper 616 and lower 612 power chambers are simply valves 632 and 634, respectively, if the artificial head systems 602 and 614 elevate the operating head high enough so that the working fluid will naturally exit the power chambers due to the increase in pressure when compared to the reservoir 610 head. Variations of auxiliary pump 636 and valve 638 systems may also be used to assist in emptying or filling the pontoon chamber 620.

Further, optional neutral buoyancy systems 640 are shown in FIG. 14 as a representation of the optional placement of system elements, such as the upper 644 and lower 646 coil tubes, in states at or near neutral buoyancy to increase efficiencies. Optional auxiliary positioning mechanisms 642 are also shown for generally assisting in mechanical assistance in starting a plant into operation or to correct hang ups, etc. Similar symbols are used throughout the depictions of exemplary embodiments and should be taken to cover other such similar optional components.

Figure 15:
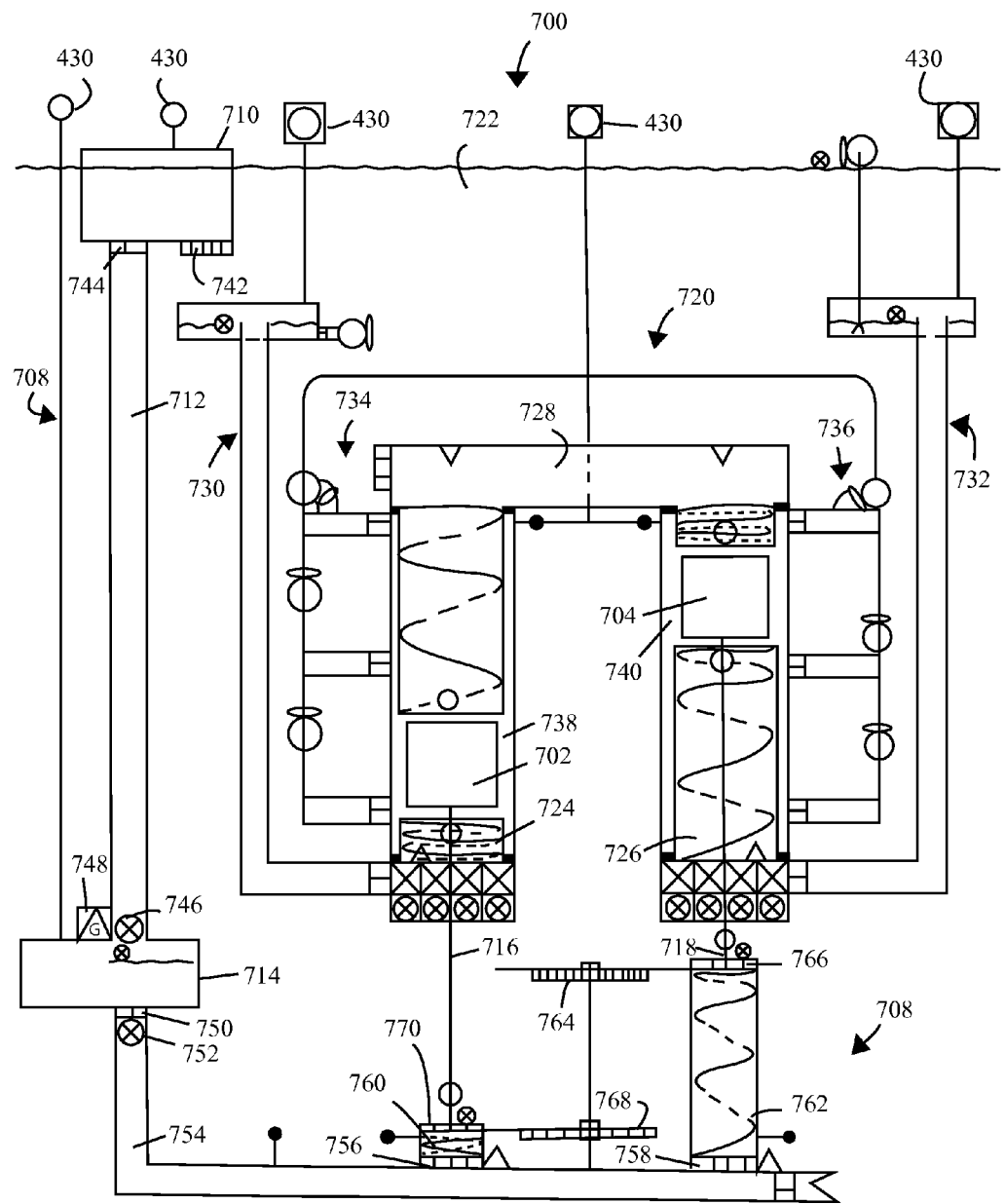
FIGS. 15-35 depict further exemplary embodiments of the invented power generation system and methods.

Turning to FIG. 15, an exemplary embodiment of a plant 700 is depicted in which the buoyant forces acting upon the first 702 and second 704 pontoons are directed to use as a driving means for an artificial dam replenishment system 706. The artificial dam 708 includes components that work to replicate the functionality of a hydroelectric dam, such as an inlet chamber 710, a penstock 712 and a turbine chamber 714. The plant 700 in this case is configured similarly to the embodiment described in connection with FIG. 13, but does not contain an artificial head system (although such a system may optionally be incorporated). The first 716 and second 718 connecting rods in FIG. 15 are coupled to the artificial dam replenishment system 706 instead of a generator or other such device, as in FIG. 13.

The purpose of the artificial dam replenishment system 706 is to use the power output by the power generating element (720 generally) to return the working fluid exiting the turbine chamber 714 to the head of the reservoir 722. The power generating element 720 of the plant 700 includes, for example, first 724 and second 726 power chambers, a constant volumetric region 728, first 730 and second 732 return systems and first 734 and second 736 means for reciprocally draining and filling the first 738 and second 740 pontoon chambers, respectively. This exemplary embodiment is meant to illustrate the optional use of an artificial dam replenishment system 706, and those skilled in the art should appreciate that other configurations for the power generating element 720 may be employed as desired, the output being used to drive the artificial dam replenishment system 706.

Working fluid from the reservoir 722 is received into the inlet chamber 710 via valve 742 as needed during plant 700 operation. The inlet chamber 710 is optional but preferred in that it may be used to protect the penstock 712 from the weather and any navigation hazards if the plant 700 is placed in a large body of water, or may serve as an access, housing or storage platform above the reservoir 722 working fluid level. Furthermore, penstock valve 744 may control the flow of working fluid from the inlet chamber 710 into the penstock 712, the operation of which being generally analogous to the operation of a traditional hydroelectric dam, in that the working fluid freefalls down the penstock 712 and through one or more turbine generators 746, thereby generating power at generation apparatus 748. The turbine chamber 714 collects the working fluid exiting the turbine generators 746 at a head much lower than that of the surrounding working fluid in the reservoir 722.

Egress of working fluid from the turbine chamber 714 into the artificial dam replenishment system 706 occurs through a turbine chamber valve 750 and optional auxiliary turbine generators 752 into a replenishment system inlet 754.

Once working fluid enters and begins to fill the inlet 754, one of the first 756 or second 758 inlet valves will open. The valve that opens will be the valve corresponding to the pontoon at the bottom of its pontoon chamber—in this example the first 756 inlet valve corresponding to the first pontoon 702. The first 756 and second 758 inlet valves each respectively connect to a first 760 and second 762 expansion tube. The first expansion tube 760 in FIG. 15 will begin to expand as the first pontoon 702 is drawn upward in the power generating element 720, such that the opening of the first inlet valve 756 will cause the working fluid to flow from the replenishment system inlet 754 and into the volume of space within the expanding first expansion tube 756. This portion of the process allows the artificial dam replenishment system 706 to remove working fluid from the turbine chamber 714, thereby allowing for continuous power generation by the artificial dam system 708.

At or before the first valve 756 opens, the second inlet valve 758 closes as the second expansion tube 762 has been filled. An upper actuation mechanism 764 or other comparable controller then opens the upper second expansion tube valve 766. As the second pontoon 704 descends during the stroke subsequent to the view in FIG. 15, the expansion tube 762 collapses, effectively evacuating the working fluid into the higher head of the reservoir 722. Similarly, as the first pontoon 702 begins to rise, a lower actuation mechanism 768 closes the previously open upper first expansion tube valve 770 prior to the opening of the first inlet valve 756. Continuous operation of the power generating element 720 in this manner permits for constant or near-constant power generation by the artificial dam 708. Note also that a secondary connection 772 shown at a broken end signifies that either: one or more power generating elements 720 may be interconnected to cooperatively return the working fluids in the artificial dam system 708 to the head of the reservoir 722; or 2) to permit multiple artificial dam systems to be connected to the power generating element 720 for return to the head of the reservoir 722.

Figure 16:
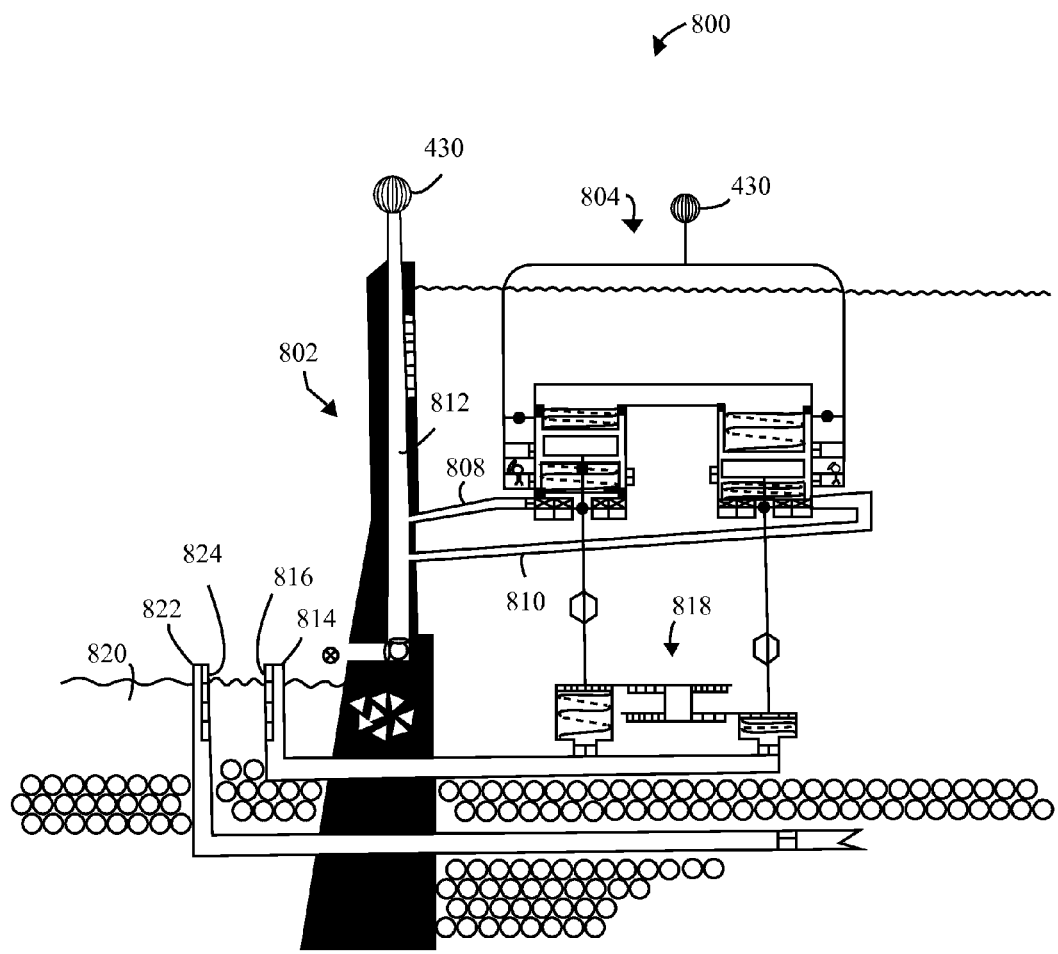

FIG. 16 is a plant 800 that is a variation of the exemplary embodiment depicted in connection with FIG. 15 with the inclusion of an actual hydroelectric dam 802 in the place of the artificial dam system. The power generating element 804 in this example is illustrated with less detail than in FIG. 15, however it should be taken to include generally the features depicted therein. The power generating element 804 operates within the upstream reservoir 806 of the dam 802, and further includes an optional feature wherein the return systems 808 and 810 are incorporated to feed directly into the penstock 812 of the hydroelectric dam 802. In this case, return stations are not needed to return the working fluids evacuated from the power chambers to the head of the reservoir 806; however it should be noted that such pump-type return systems may be included if desired.

The replenishment system inlet 814 may include an inlet valve 816 and returns working fluid from the downstream reservoir 820 (analogous to the turbine chamber 714 of FIG. 15) to the dam replenishment system 818, which in turn operates generally as described in connection with the artificial dam replenishment system 706 of FIG. 15. Note also the presence of one or more secondary replenishment system inlets 822 and inlet valves 824 that may optionally lead to additional power generating elements 804 to increase the flow rate capability from the downstream reservoir 820 to the upstream reservoir 806.

Figure 17:
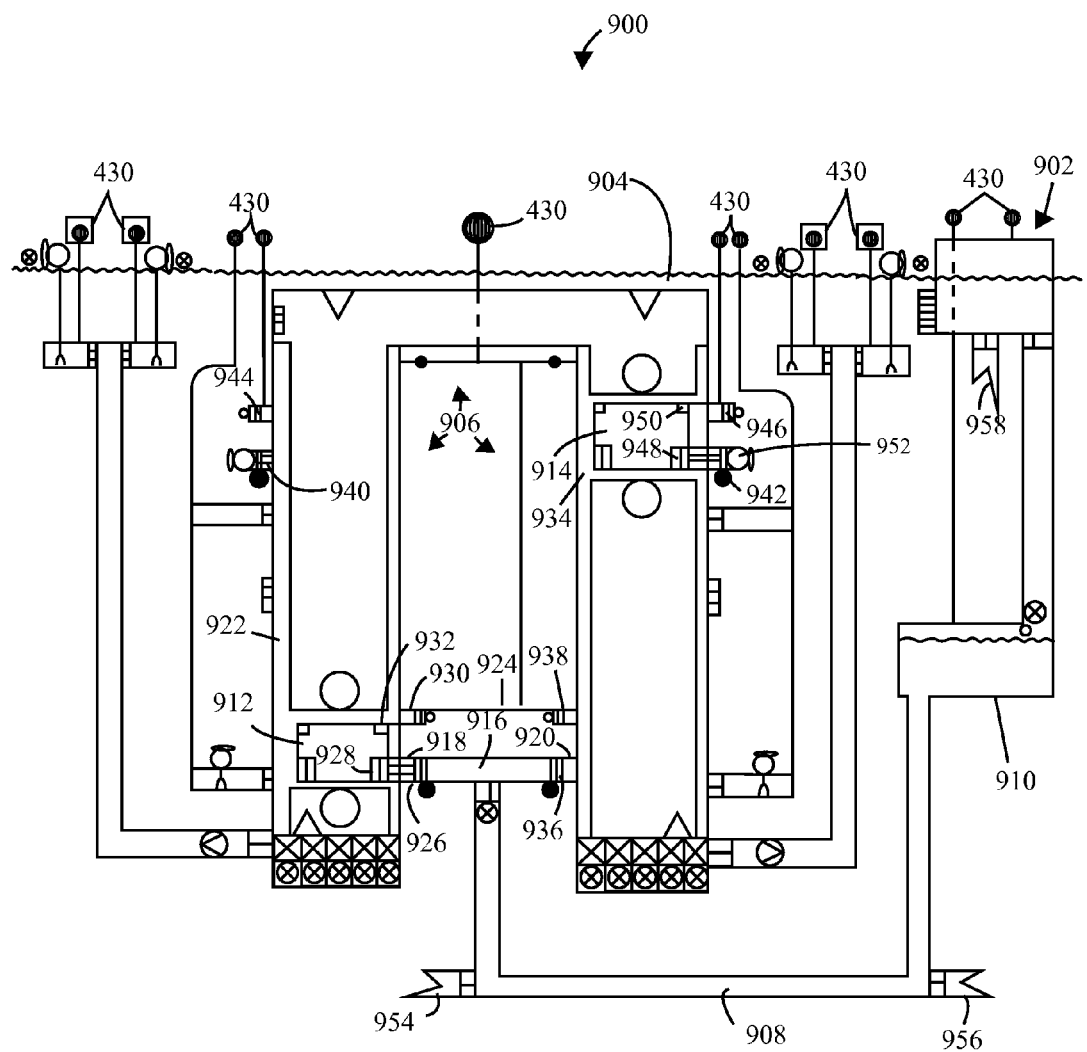

A further exemplary embodiment of a plant 900 is depicted in FIG. 17 that is also configured to return working fluid from the low head side of an artificial dam system 902 (or alternatively an existing or new traditional hydroelectric dam as described in connection with FIG. 16) to the higher head of the reservoir 904. As an alternative to using the work output by the power generating element 906 to drive a separate artificial dam replenishment system (see 706 in FIG. 15 or 818 in FIG. 16), the power generating element 906 is itself used as the artificial dam replenishment system.

The replenishment system inlet 908 can be configured to channel the working fluid exiting the turbine chamber 910 of the artificial dam system 902 into the volumetric space within the first 912 and second 914 pontoons in an alternative fashion, thereby converting the use of the pontoons into components of a working fluid evacuation system. A common pontoon feed pipe 916 utilizes first 918 and second 920 feed pipe valves to direct the working fluid exiting the turbine chamber 910 into either the first 912 or second 914 pontoons, respectively. Note that each pontoon may be operatively connected to the turbine chamber 910 by a discrete and separate replenishment system inlet 908, making the use of the feed pipe 916 optional but preferred in order to reduce materials costs.

When a pontoon—such as the first pontoon 912 shown in FIG. 17—is empty and at the bottom of its pontoon chamber 922, it is operatively aligned (if needed) and connected with the pontoon feed pipe 916 by a lower fluid connection system 926 that joins the first feed pipe valve 918 with the first pontoon fluid valve 928, enabling working fluid to flow from the turbine chamber 910 into the first pontoon 912 while preventing working fluid in the pontoon chamber 922 from entering the pontoon 912. A lower vent connection system 930 likewise may be used to join an atmospheric air vent, such as 924, with a first pontoon air valve 932. The connection systems 926 and 930 need not necessarily be separate mechanisms, but may optionally be combined if desired, and are shown separately to aid in understanding. Note that the turbine chamber 910 is positioned horizontally inline or above the low position of the pontoons 912 and 914 such that the working fluid will flow naturally from the turbine chamber into a pontoon.

The connection systems 926 and 930 correspond to the first pontoon 912, and the second pontoon chamber 934 is equipped with similar lower connections systems 936 and 938 for use when the second pontoon 914 reaches the bottom of the second pontoon chamber 934. In a similar fashion, both the first 922 and second 934 pontoon chambers each have, respectively, a first 940 and second 942 upper fluid connection system, as well as a first 944 and second 946 upper vent connection system. The second upper fluid connection system 942 and the second upper vent connection system 946 are shown coupled to the second pontoon 914 at the top of the second pontoon chamber 934 at its second pontoon fluid valve 948 and second pontoon air valve 950. The second pontoon 934 has lifted the working fluid previously collected from the turbine chamber 910, and a second pontoon pump 952 empties the working fluid from the pontoon into the head of the surrounding reservoir 904.

Note that it may be advantageous to employ multiple artificial dam replenishment systems to an artificial dam system 902, as discussed previously herein. Broken connections 954 and 956 represent cycling turbine chamber 910 evacuation duties between multiple artificial dam replenishment systems. Similarly, for a large capacity replenishment system, it may be desirous to utilize multiple artificial dam systems, represented by connection 958. Those skilled in the art will appreciate that further depictions of such connections represent the use of additional systems to obtain smoother power generation through cycling, or to increase the capacity of a particular embodiment.

Figure 18:
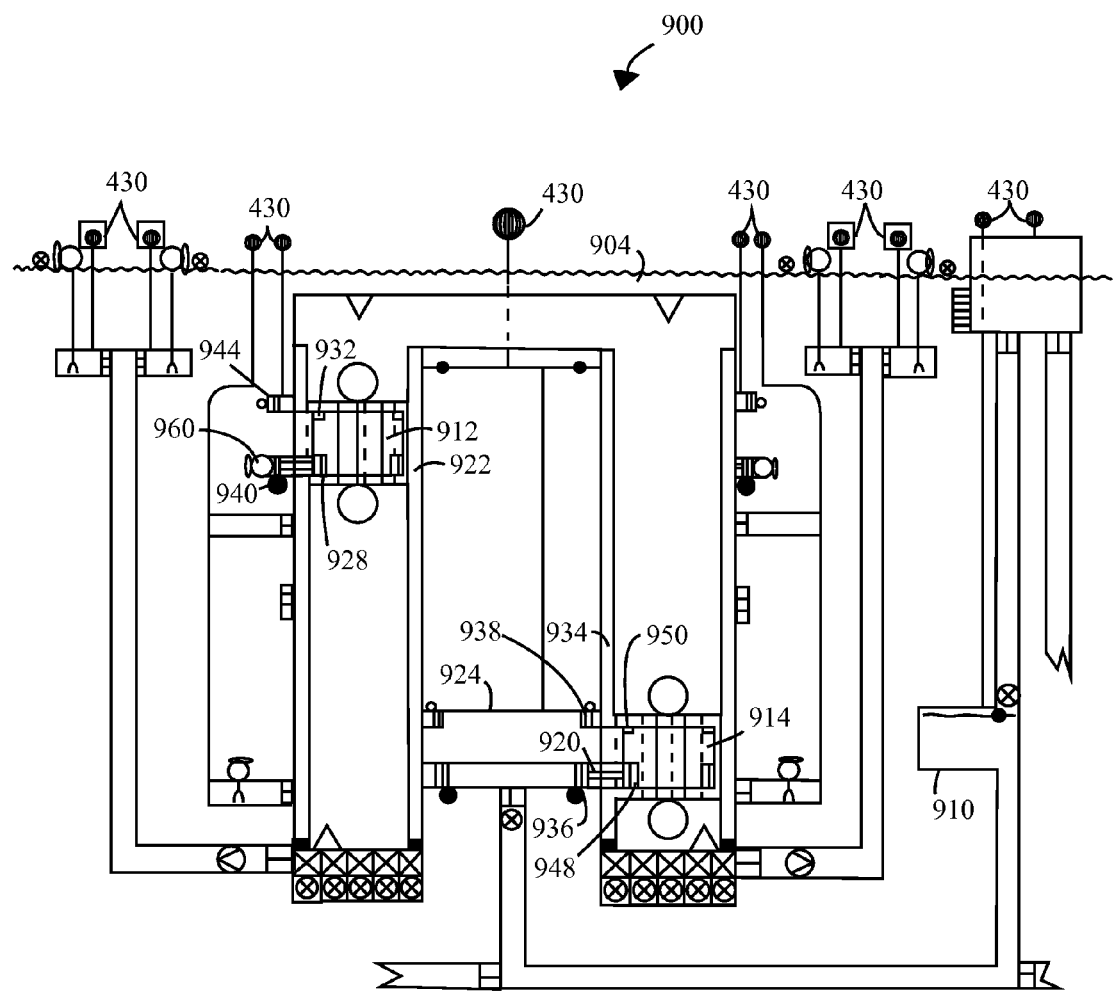

FIG. 18 depicts the exemplary embodiment of the plant 900 described in FIG. 17, but at the end of the stroke beginning in that figure. Thus, the first pontoon 912 has reached the apex of the first pontoon chamber 922, and the first upper fluid connection system 940 and first upper vent connection system 944 have coupled with the first pontoon fluid valve 928 and the first pontoon air valve 932, respectively. The first pontoon pump 960 commences emptying of the first pontoon 912 of the working fluid received from the turbine chamber 910 as shown in FIG. 17.

The second pontoon 914 has simultaneously reached the lower bound of its movement in the second pontoon chamber 934, and the second lower fluid connection system 936 and second lower vent connection system 938 have coupled with the second pontoon fluid valve 948 and the second pontoon air valve 950, respectively. The second feed pipe valve 920 now opens and the empty second pontoon 914 begins to fill with working fluid received from the turbine chamber 910.

Note that the pontoon valves (928, 932, 948 and 950) shown in FIGS. 17-18 are depicted in several locations for each pontoon. It may be preferable to include several valves about the circumference of each pontoon for convenience. Alternatively, for cradle systems that do not permit pontoon rotation about a vertical axis, single fluid and air valves are preferred. FIG. 18 depicts the use of a cage-type cradle system (see FIG. 12A), and thus multiple valve locations are preferred in order for the easiest alignment of the valves with the connection system mechanisms (e.g., 940 and 944).

Figure 19:
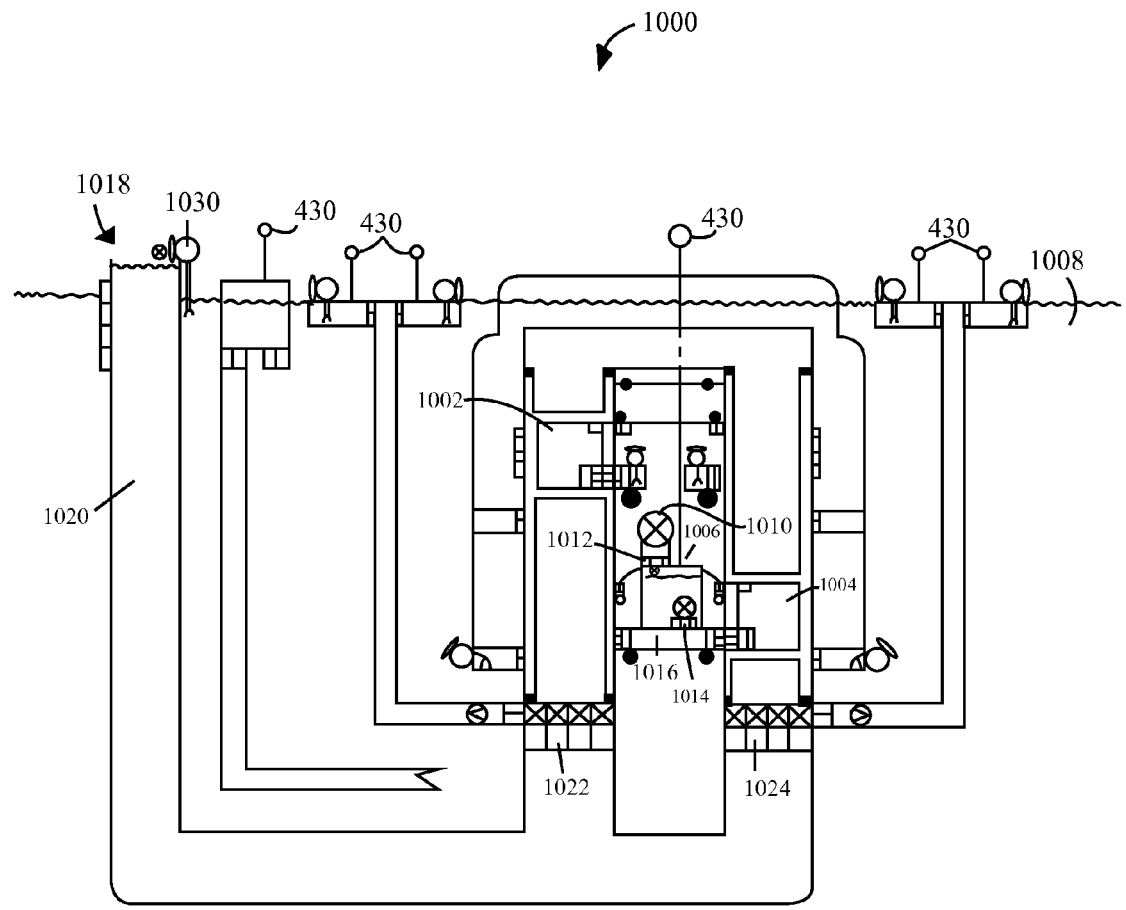

Another exemplary embodiment of a plant 1000 is shown in FIG. 19. The plant 1000 incorporates the use of its first 1002 and second 1004 pontoons to replenish a turbine chamber 1006 similarly to the exemplary embodiment discussed in FIGS. 17-18. One variation between the embodiments is that the turbine chamber 1006 is filled with working fluid received from the reservoir 1008 directly through a submerged inlet with turbine generators 1010 situated therein. Upper 1012 and lower 1014 turbine chamber valves control the flow of working fluid into the turbine chamber 1006 and a common pontoon feed pipe 1016, respectively. Working fluid entering the common pontoon feed pipe 1016 is then received by the pontoons 1002 and 1004 reciprocally and carried to the top of their respective pontoon chambers as previously described.

Another important variation to note is that the plant 1000 in FIG. 19 includes an artificial head system 1018 to increase the pressure differential experienced between the first 1026 and second 1028 return systems and the first 1022 and second 1024 power chamber valves. The artificial head system 1018 is further configured with a single artificial head chamber 1020 leading to both power chamber valves 1022 and 1024. The use of a single artificial head chamber 1020 permits the use of a single artificial head pump 1030, generally preferable from a cost standpoint over two (see, e.g., FIG. 13).

Figure 20:
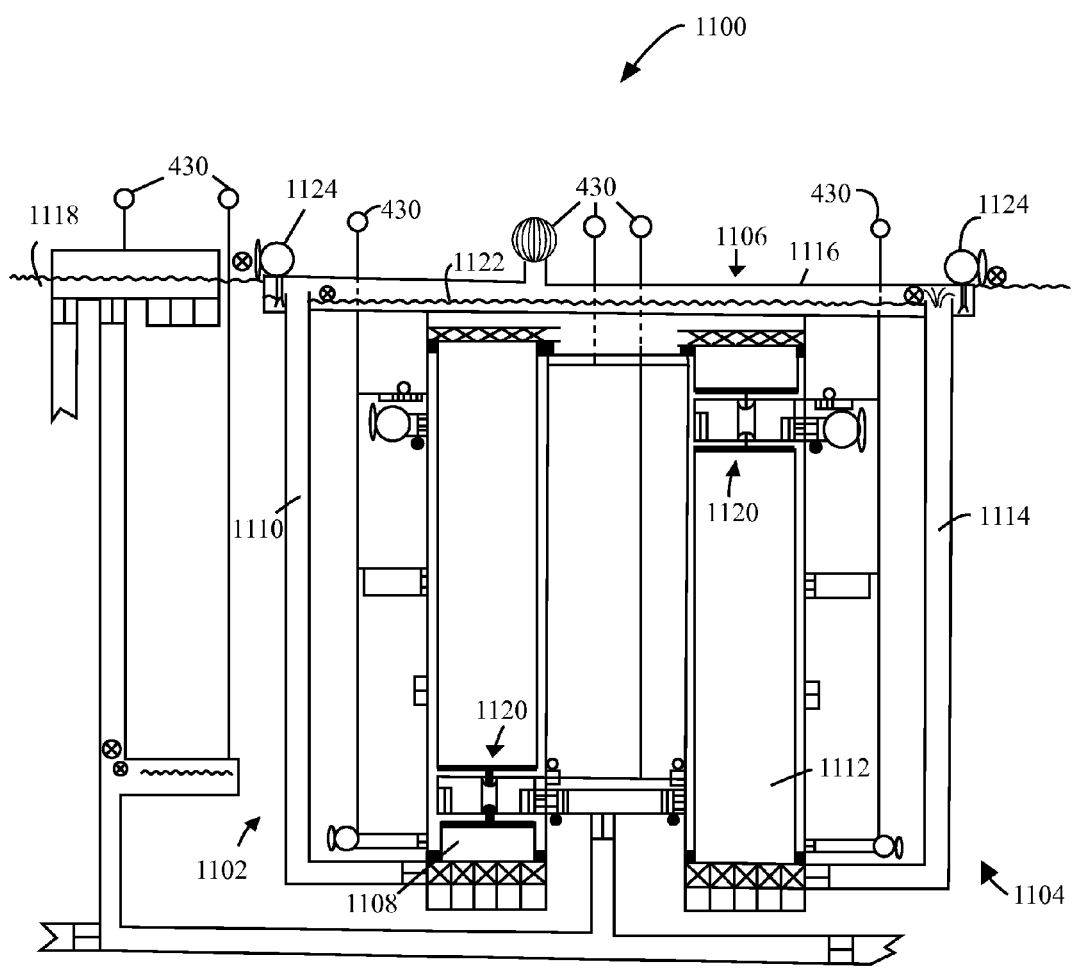

As previously discussed herein, the main purpose of a return station is to receive a volume of working fluid as it flows from the power chamber due to pressure differentials, isolate it therefrom, and return the working fluid to the reservoir by pumping the short head of working fluid contained within. FIG. 20 illustrates an exemplary embodiment of a plant 1100 in which the first 1102 and second 1104 return systems share a single, integral return station 1106. The return station 1106 receives working fluid expelled from the first power chamber 1108 through the first evacuation tube 1110 of the first return system 1102, and from the second power chamber 1112 through the second evacuation tube 1114 of the second return system 1104. Both the first 1110 and second 1114 evacuation tubes empty at their distal end into the integral holding chamber 1116 of the return station 1106, the distal end being positioned below the fluid level of the reservoir 1118. One or more holding tank pumps 1124 are used to pump the working fluid in the holding chamber 1116 into the reservoir 1118, and should be selected to maintain the level 1122 of the working fluid in the holding chamber 1116 below the distal ends of the first 1110 and second 1114 evacuation tubes, thereby employing a fountain-type return station.

This exemplary embodiment of a return system and return station can be used to permit continual evacuation of the holding chamber 1116 during plant 1100 operation without the need to use multiple return stations per return system. Cycling between multiple return stations and isolating each from the power chamber with a valve as described previously can in some circumstances create excess cost, and therefore the fountain-type return station configuration is preferred. Note that the return stations need not be integral between, for instance, the first and second return systems, as shown in FIG. 20, and could be implemented as separate return stations depending upon the application. Furthermore, the embodiments of the various return systems described herein may be used interchangeably to suit the user's circumstances wherever practical. Note also that the plant 1100 embodiment is shown with an exemplary use of the through-hole type cradle system 1120 as described previously in connection with FIG. 12B.

Figure 21:
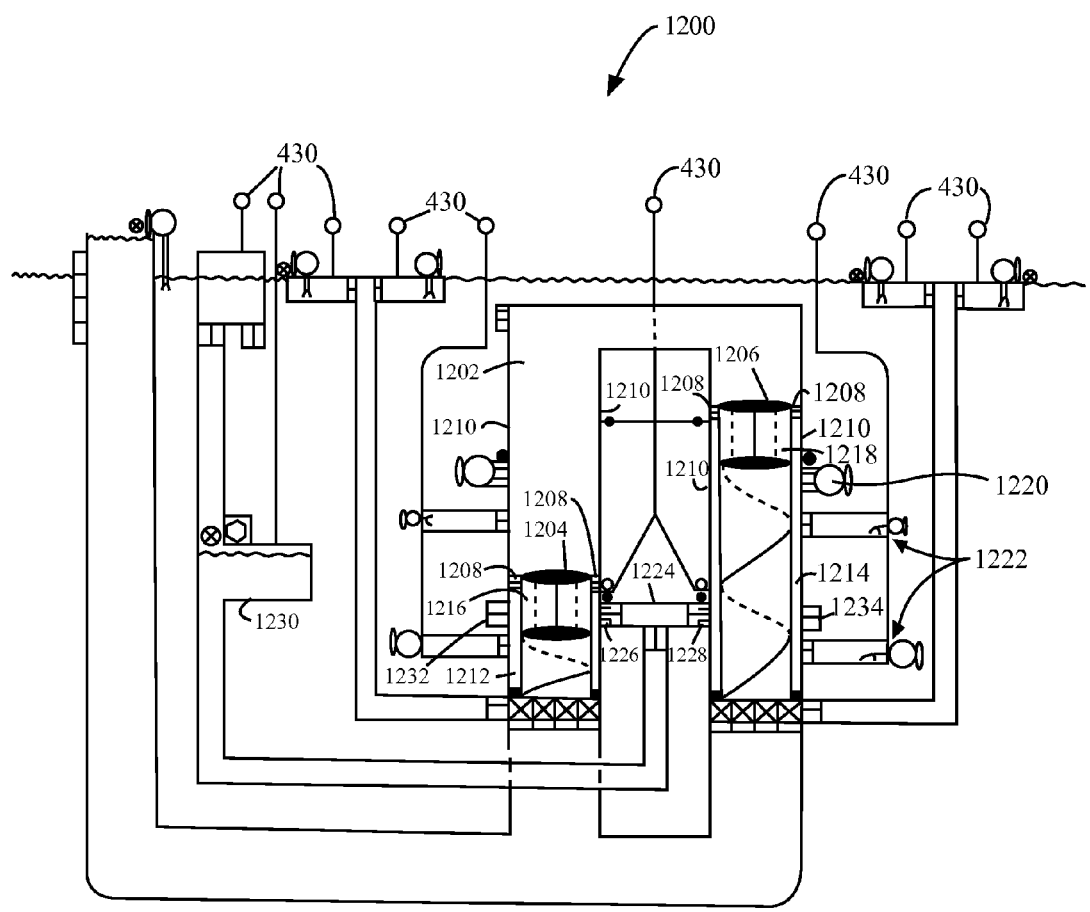

Turning to FIG. 21, a further exemplary embodiment of a plant 1200 is depicted wherein the constant volumetric region 1202 is defined at its movable ends by a first 1204 and second 1206 plate that is sealed with movable (e.g., sliding or rolling) gaskets connections 1208 to the chamber walls 1210. The gaskets 1208 seal the boundary between the constant volumetric region 1202 and the first 1212 and second 1214 pontoon chambers.

The operation of the plant 1200 may be modified from the similar embodiment shown in connection with FIG. 20, for instance, in that the nullification or reduction of the buoyancy of the first 1216 and second 1218 containers may optionally be accomplished in the following manner. FIG. 21 depicts the second container 1218 as it is being evacuated of its contents by the second pontoon pump 1220. The working fluid in the second pontoon chamber 1214 must be drained, but instead of utilizing pontoon chamber compartments and pumps 1222, the working fluid therein is transferred, via common pontoon feed pipe 1224 and valves 1226 and 1228, into the first container 1216. The remaining majority of the first pontoon volume is filled thereafter with working fluid from the turbine chamber 1230. Working fluid is received to refill the first pontoon chamber 1212 via valve 1232 to re-establish buoyant forces (and later via valve 1234 for the second pontoon chamber 1214). In this method, therefore, the chamber compartments and pumps 1222 are preferably not used, and may be excluded from the plant 1200 if so desired.

Figure 22:
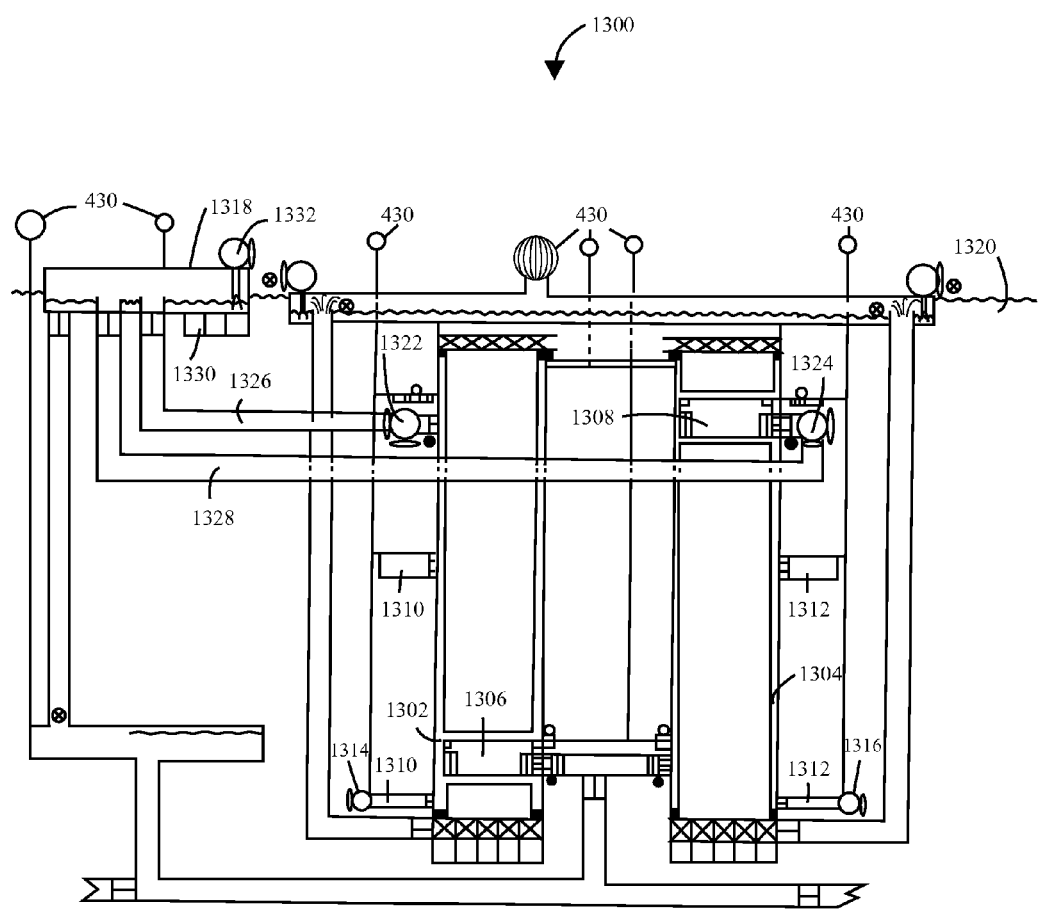

It will be clear to those skilled in the art that such a method of draining and refilling the pontoon chambers may be included in many other combinations and embodiments if so desired. For example, the exemplary embodiment of a plant 1300 depicted in FIG. 22 may utilize the previously described method to drain the first 1302 and second 1304 pontoon chambers, wherein the first pontoon 1306 receives, lifts and disposes of the working fluid drained from the second pontoon chamber 1304, and the second pontoon 1308 receives, lifts and disposes of the working fluid from the first pontoon chamber 1302. Alternatively, a system such as the means for reciprocally draining and filling the pontoon chambers described previously (e.g., see FIG. 13) utilizing optional first 1310 and second 1312 pontoon chamber compartments and first 1314 and second 1316 pontoon chamber pumps, for instance.

Figure 23:
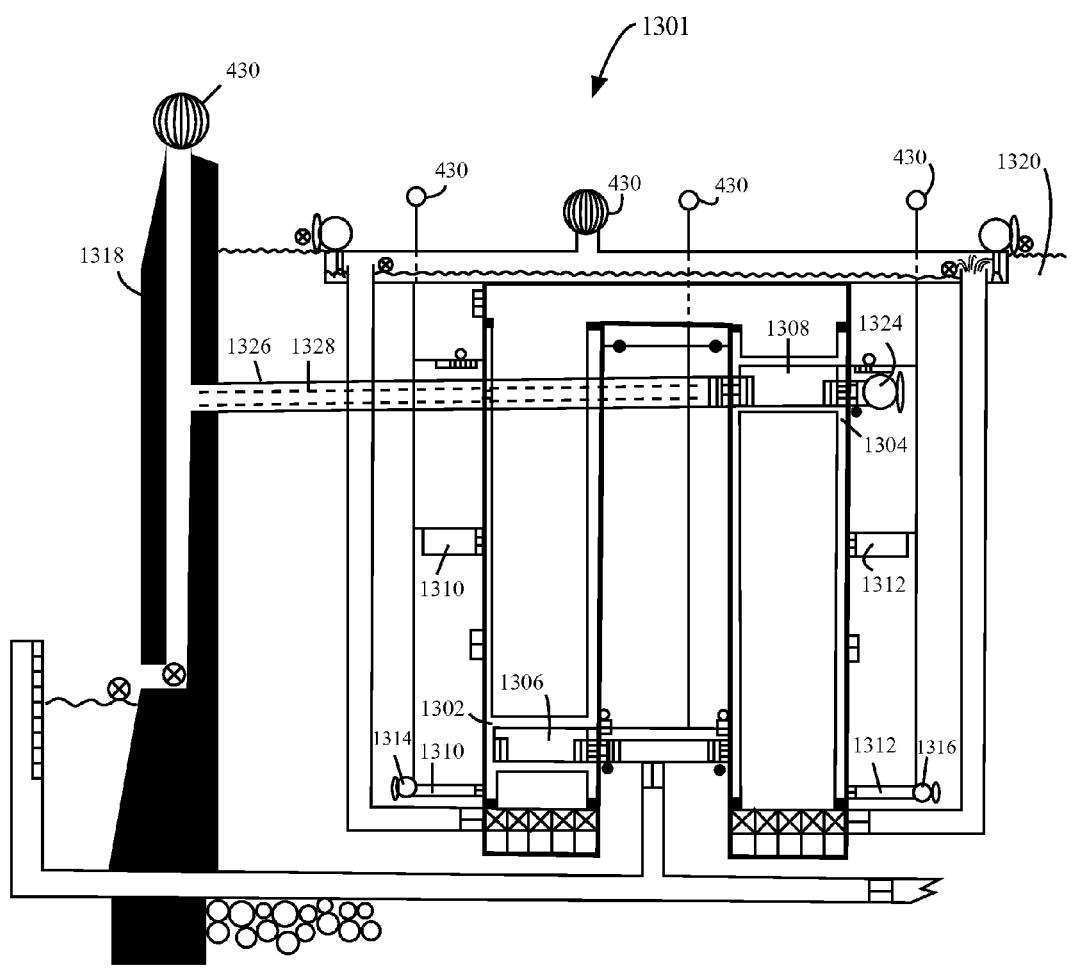

The plant 1300 additionally illustrates an embodiment wherein the working fluid evacuated from the first 1306 and second 1308 pontoons is pumped into an artificial dam inlet chamber 1318, as opposed to directly into the reservoir 1320. The first 1322 and second 1324 pontoon pumps reciprocally evacuate the working fluid carried by the pontoons directly into the inlet chamber 1318 via first 1326 and second 1328 connections. For this method of operation, an inlet chamber valve 1330 and inlet chamber pump 1332 may be provided for regulation of the working fluid level therein. FIG. 23 is a further depiction of the embodiment shown in FIG. 22 wherein the plant 1301 is in use with a traditional hydroelectric dam, and corresponding components are labeled with like numbers.

Figure 24:
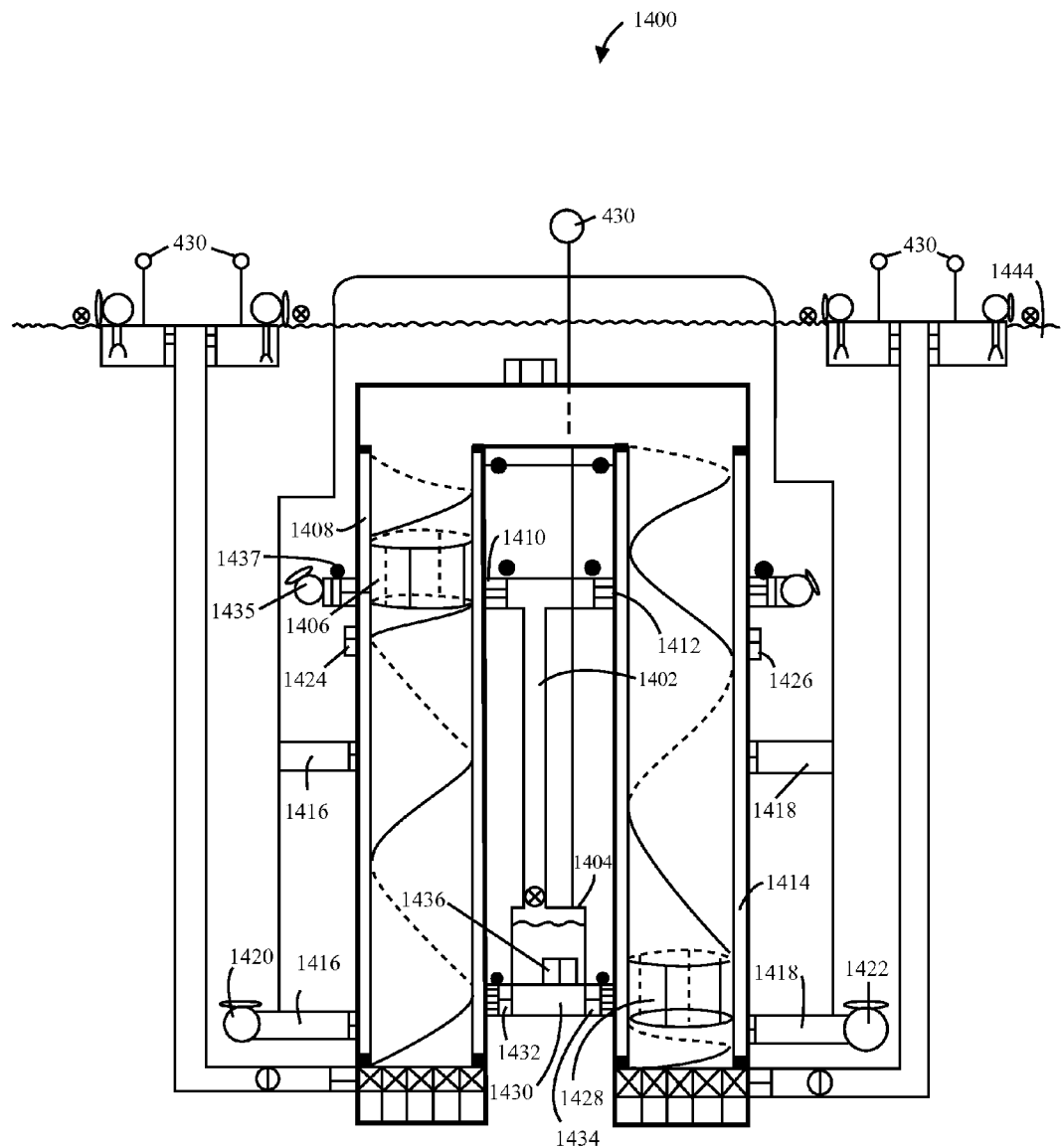

Some exemplary embodiments of the invention have been described wherein the pontoons are used to return a working fluid from the low head side of a penstock and turbine generator dam configuration near the high head side and evacuate the working fluid by pumping it from the pontoon into the high head reservoir. Further embodiments, such as those shown in FIGS. 22-23, have demonstrated that the working fluid received by the pontoons can be pumped directly back into the higher-head of the inlet chamber or penstock in the dam configuration. Another exemplary embodiment of a plant 1400 is depicted in FIG. 24, which illustrates that the penstock 1402 leading into the turbine chamber 1404 may be reciprocally fed from the pontoons at the top of their respective pontoon chambers, shown here as the first container 1406 at the top of the first pontoon chamber 1408. As in the embodiment shown in connection with FIG. 18, the plant 1400 utilizes first 1410 and second 1412 upper fluid connection and vent systems to evacuate the pontoons into the penstock 1402 to generate power.

FIG. 24 additionally illustrates two optional systems that may be used in combination or separately as the means of reciprocally draining and refilling the first 1408 and second 1414 pontoon chambers. As described in connection with FIGS. 13 and 23, for instance, optional first 1416 and second 1418 pontoon chamber compartments, first 1420 and second 1422 pontoon chamber pumps, and first 1424 and second 1426 pontoon chamber valves may be used to drain and refill the pontoon chambers to nullify or reduce the buoyancy of the pontoons for preparation of their descent when empty.

Alternatively, the fluid in the first pontoon chamber 1408 can be drained into the second container 1428 through a common pontoon feed pipe 1430 by opening valves 1432 and 1434. After the first pontoon chamber 1408 has been emptied and the buoyancy of the first pontoon 1406 negated, the valve 1432 is closed and turbine chamber valve 1436 is opened, thereby filling the second pontoon 1428 with working fluid from the turbine chamber 1404. In this case, the means for reciprocally draining and filling the first and second pontoon chambers operates similarly to that described in connection with FIG. 21 and that portion of the working fluid in the pontoon is pumped into the reservoir 1444, for instance via draining pump 1435 and multitask fluid and vent system 1437. Those skilled in the art will appreciate that any of these methods described herein may be used to drain and refill the pontoon chambers, and that the depiction of multiple subsystems suited for the task in a given embodiment are intended for illustrative purposes if not utilized.

Figure 25:
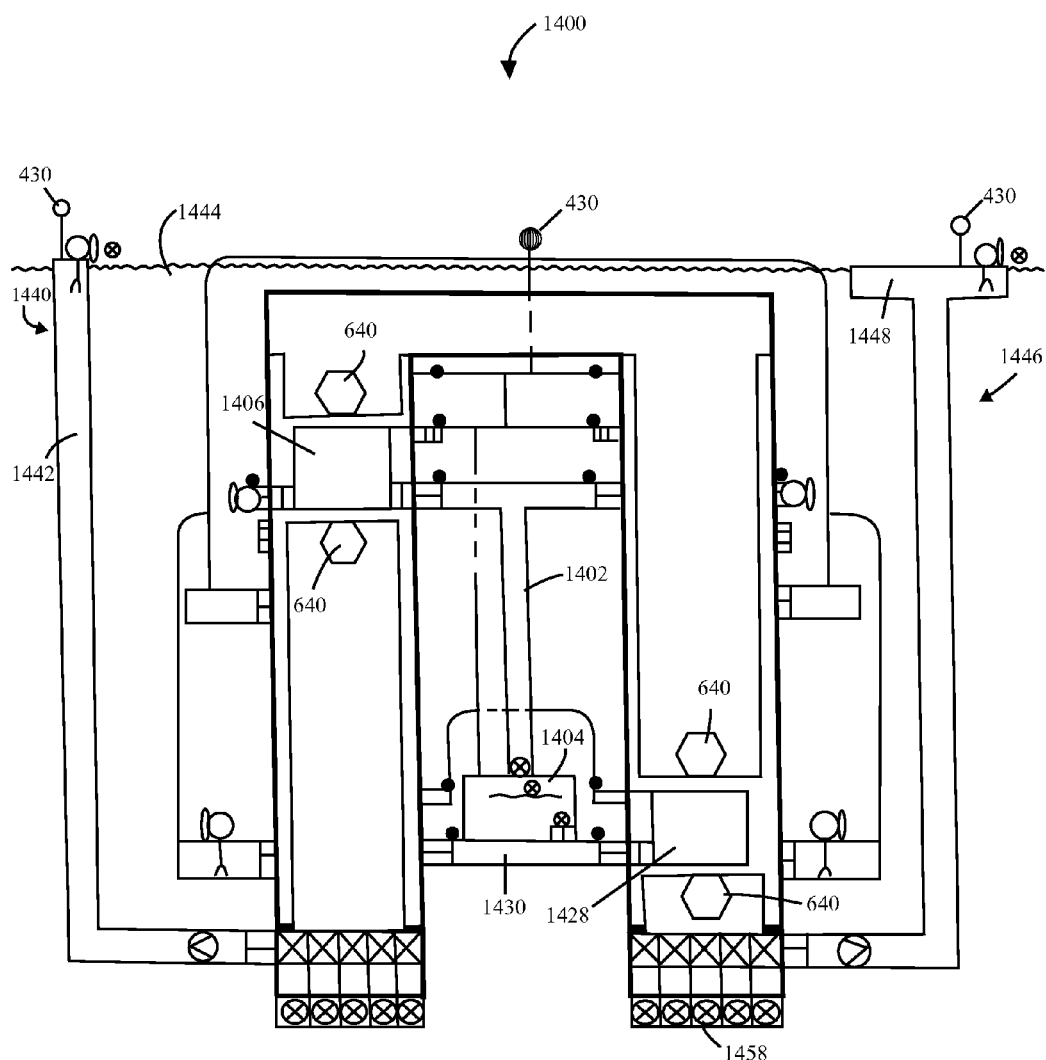
Figure 26:
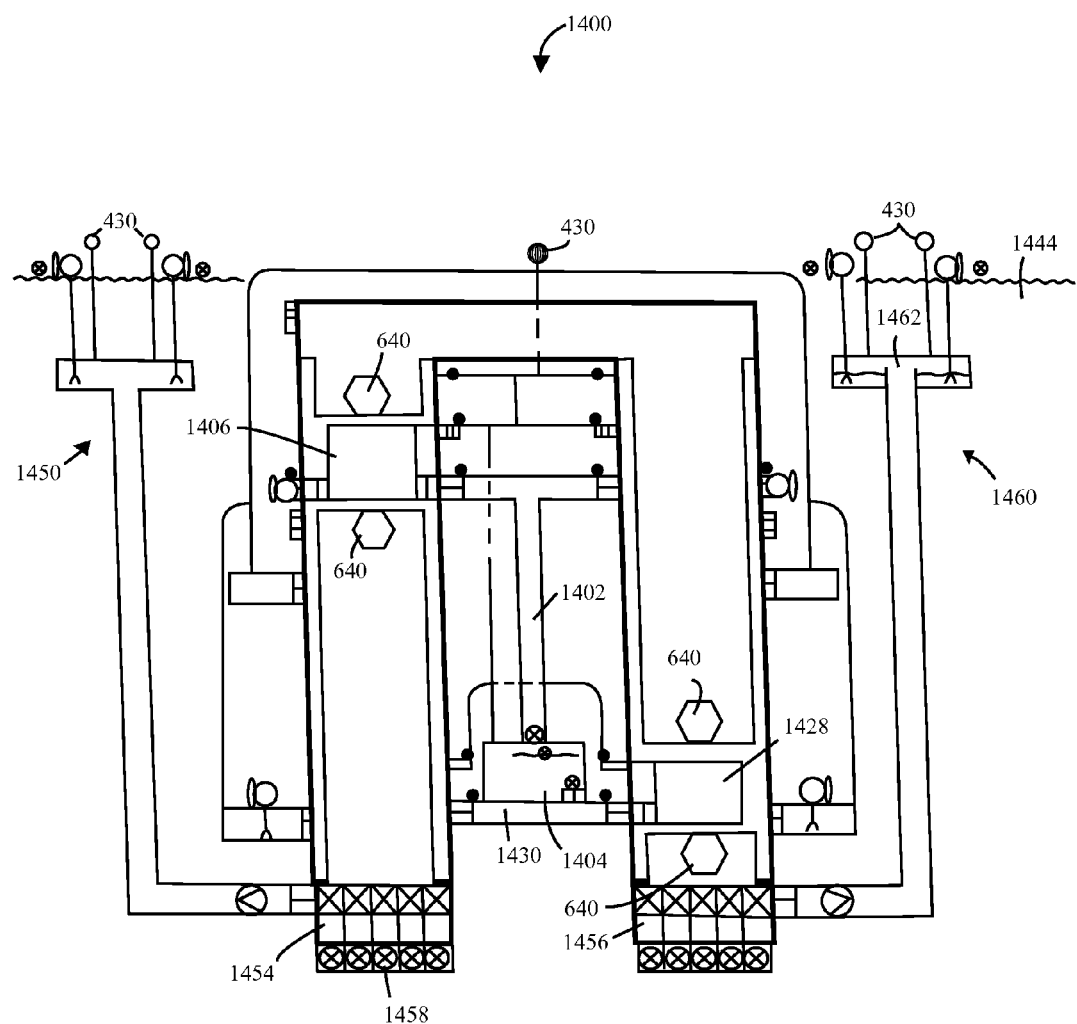

FIGS. 25-26 depict variations of the exemplary embodiment described in connection with FIG. 24, with the difference being the use of further embodiments of various return system configurations. For example, the first 1440 and second 1446 return systems in FIG. 25 do not include return stations, in that they do not contain holding tanks that are isolated from the power chamber for any portion of the evacuation process, pumping directly from the evacuation tube 1442 into the reservoir 1444 in the case of the first return system 1440 and from the non-isolated holding tank 1448 in the second return system 1446. The first return system 1450 shown in FIG. 26 is similar to the second return system 1446 with the exception that the distal end of the system is deeper in the reservoir, requiring the return system pumps 1452 to pump a greater head of working fluid, but also allowing for a higher pressure differential experienced at the first 1454 and second 1456 power chamber external valves. The second return system 1460 is similarly at a greater depth, and utilizes a fountain-type return station 1462 as previously described herein. Note also the presence of optional neutral buoyancy systems 640 as described in connection with FIG. 13, and the optional inclusion of gate turbine generators 1458 at the power chamber inlets.

Figure 27:
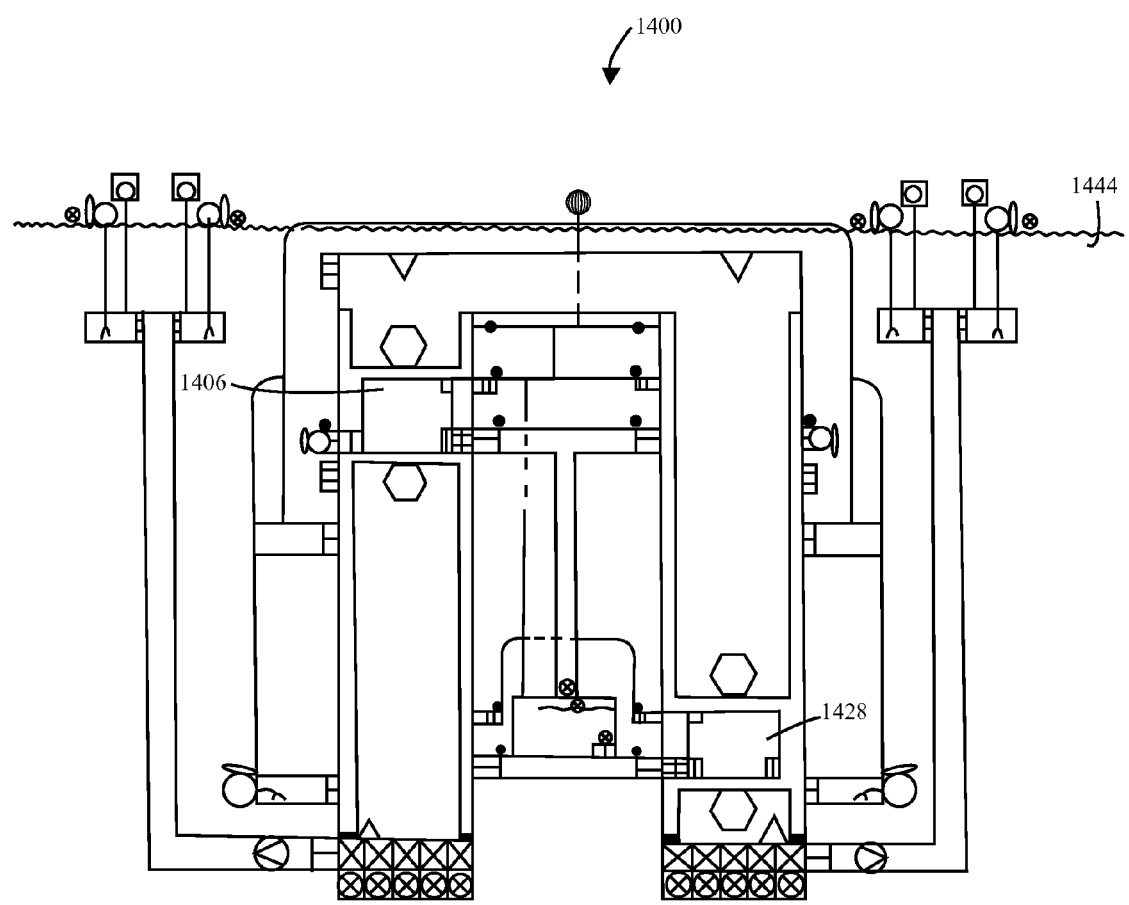

FIG. 27 is used to illustrate that, while many of the exemplary embodiments herein are depicted with pontoons, such as first and second pontoon 1406 and 1428 shown therein, the system is identical to that shown in FIG. 24 because containers and pontoons function in the same manner as sealed airspaces (or fluid spaces, solution spaces, etc.) when buoyant forces are not being used to drive other devices (e.g., generators as in FIG. 13. See FIG. 21 above and the related disclosure for an additional example of the use of a general container. Containers are fixed between the power chamber and constant volumetric region and do not experience buoyant forces from the pontoon chamber working fluid, but may still be used to lift working fluids from higher to lower heads as previously described herein. Pontoons can be containers where they are fixed to the power chamber and constant volumetric region boundaries, unlike the pontoons 1406 and 1428 shown in FIG. 27.

Figure 28:
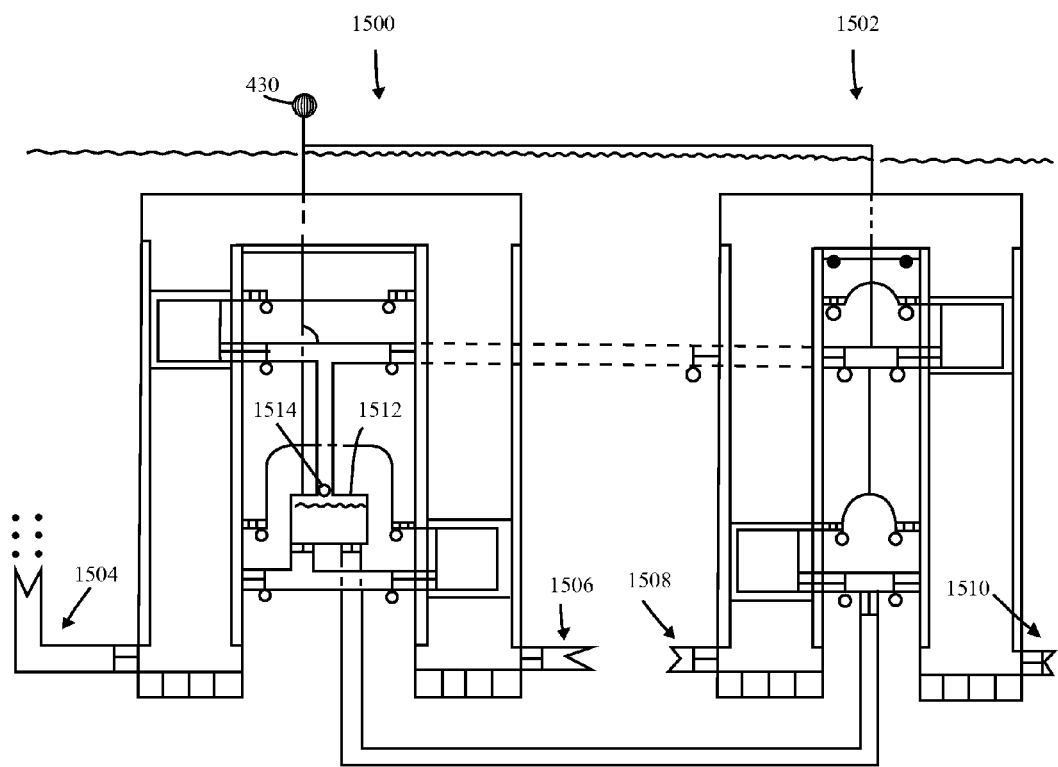

Turning to FIG. 28, the use and exemplary interconnection of multiple power generating elements 1500 and 1502 are illustrated to demonstrate that modular components of the invention can be utilized together to increase throughput and power generating capacity if desired, as discussed previously in connection with FIG. 17. Details such as the configuration of the return systems 1504, 1506, 1508 and 1510 and means for reciprocally draining and refilling the pontoon chambers, etc. are excluded to highlight an exemplary connection between a turbine chamber 1512 and multiple power generating elements such as 1500 and 1502. Vent systems 430 can be interconnected and centralized as well. As additional power generating elements are connected to the artificial dam system, the flow rate of the working fluid increases, generating additional power at the turbine generator(s) 1514.

Figure 29:
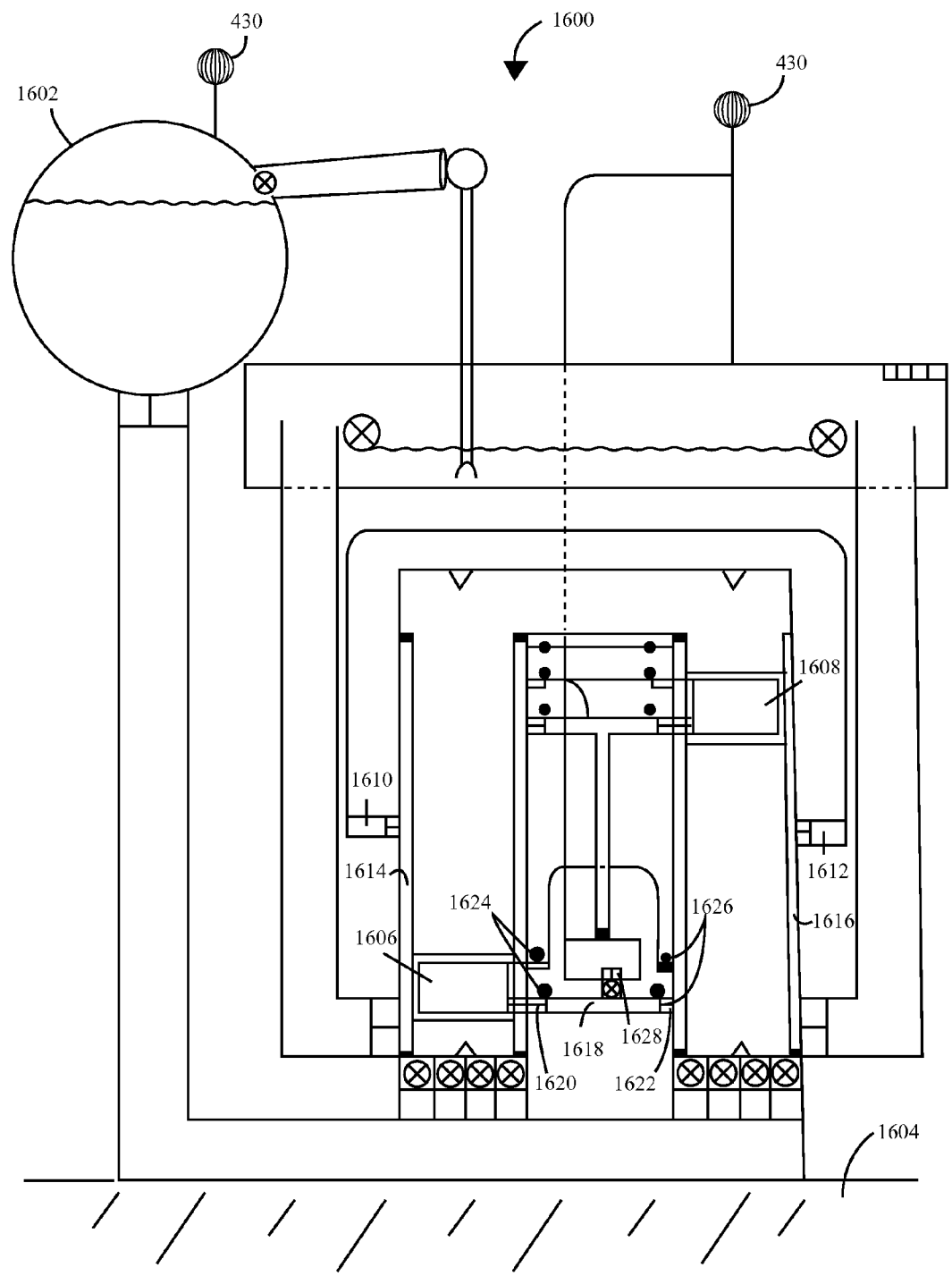
Figure 30:
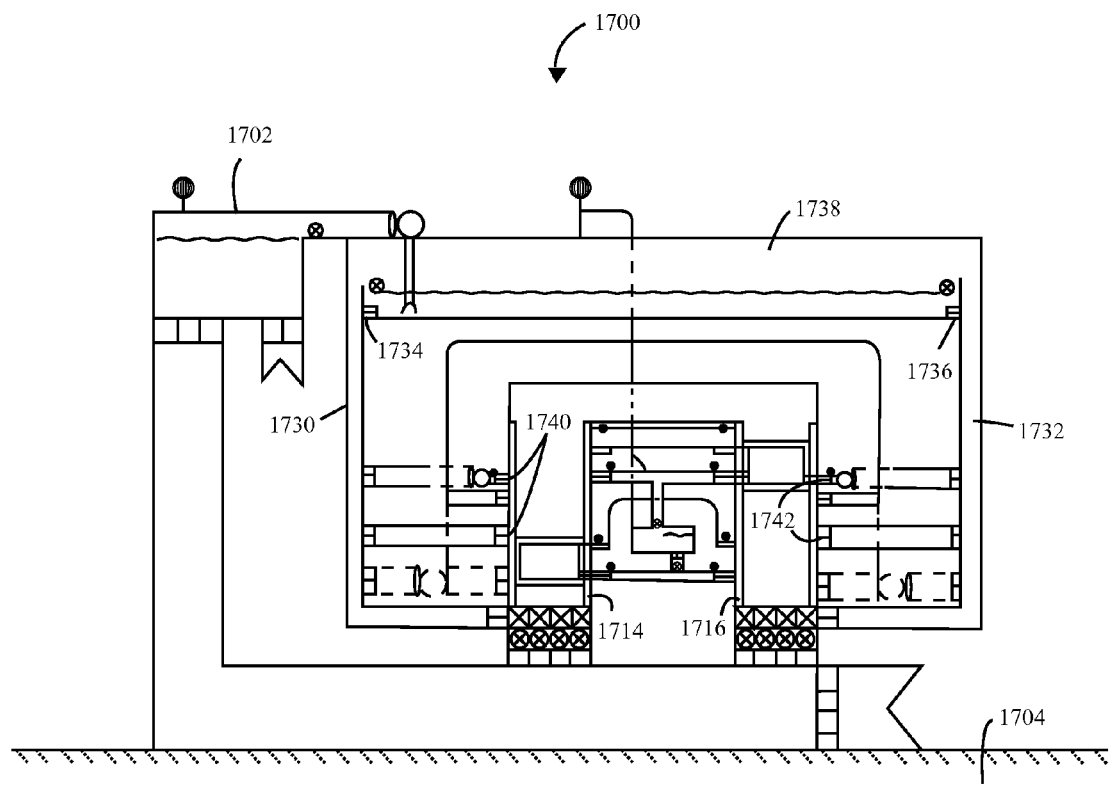

Many references throughout have been made to reservoirs in general, whether the plants operate in man-made bodies of water, natural bodies of water, inside of containers or tanks, or other such reservoirs as previously described herein. FIGS. 29-30 illustrate that the term reservoir applies generally to the reference head of working fluid in which the system operates, and thus can be embodied as a reservoir in a tank, wherein the return systems are connected directly to the input for the power chambers. For example, plants 1600 in FIGS. 29 and 1700 in FIG. 30 are respectively equipped with reservoir tanks 1602 and 1702, allowing operation of the invention surrounded by air—e.g., resting upon the ground 1604 and 1704. The power generation in both plants 1600 and 1700 occur as described in connection with FIGS. 24-27 generally, and the main difference between the two embodiments exists in the means for reciprocally draining and refilling their first and second pontoon chambers.

In FIG. 29, the working fluid is reciprocally exchanged between the first 1606 and second 1608 pontoons, as previously described herein. The first 1610 and second 1612 pontoon chamber compartments are positioned to receive approximately half of the volumetric contents of their respective first 1614 and second 1616 pontoon chambers when draining the pontoon chamber. The remaining portion of the working fluid from either pontoon chamber flows into the common pontoon feed pipe 1618 and through valves 1620 and 1622. A smaller portion of the working fluid from the pontoon chamber being drained may need to be pumped via a multipurpose system (i.e., 1624 or 1626) due to equilibrium being reached during draining. In the case of the system state shown specifically in FIG. 29, wherein the second pontoon chamber 1616 is being drained to negate the buoyancy of the second pontoon 1608, the second pontoon chamber compartment 1612 is filled with a portion of the working fluid that needs drained, valves 1620 and 1622 are opened until the working fluid in the first pontoon 1606 and second pontoon chamber 1616 have reach equilibrium, at which point valve 1622 is closed, and the turbine chamber valve 1628 is opened to fill the remaining volume of unused space in the first pontoon 1606.

FIG. 30, on the other hand, represents an alternative means for reciprocally draining and refilling the first 1714 and second 1716 pontoon chambers in which the first 1730 and second 1732 return systems are connected to the pontoon chambers via several connections. Since working fluid drained from a pontoon chamber into the return system must be put back into a pontoon chamber, return system valves 1734 and 1736 are provided to permit working fluid in the integral return station 1738 to bypass its fountain system, thereby increasing the head seen at the pontoon chamber inlets 1740 and 1742 that are connected to the return systems 1730 and 1732, respectively.

Figure 31:
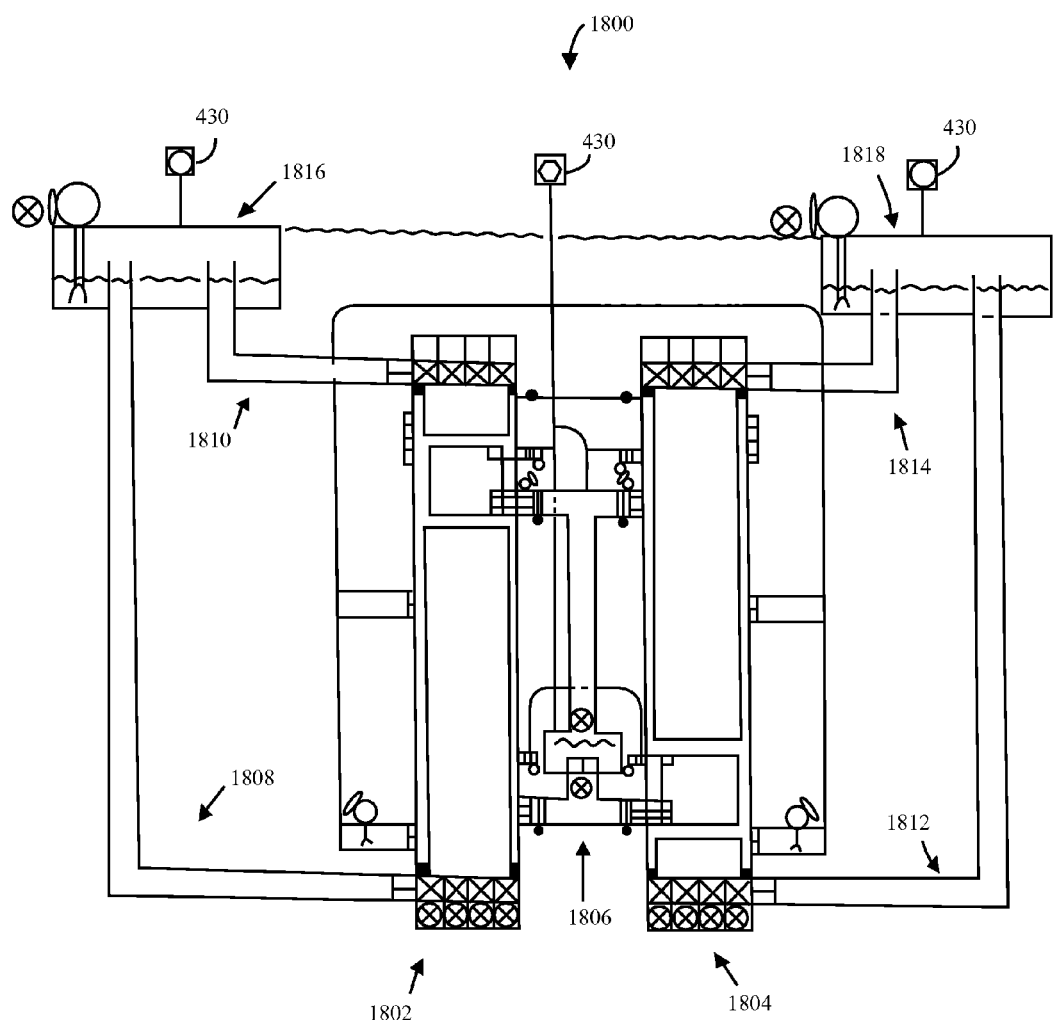

FIG. 31 simply demonstrates that the systems and methods described in detail herein may be combined, as will now be evident to those skilled in the art, in various combinations, such as a plant 1800 that utilizes at least two single-chamber systems 1802 and 1804 interconnected with an artificial dam 1806 as the primary power generating means. The single systems 1802 and 1804 operate similarly to the exemplary embodiment described in connection with FIG. 14, but includes return systems 1808, 1810, 1812 and 1814 and integral return stations 1816 and 1818 without the use of an artificial head system.

Figure 32:
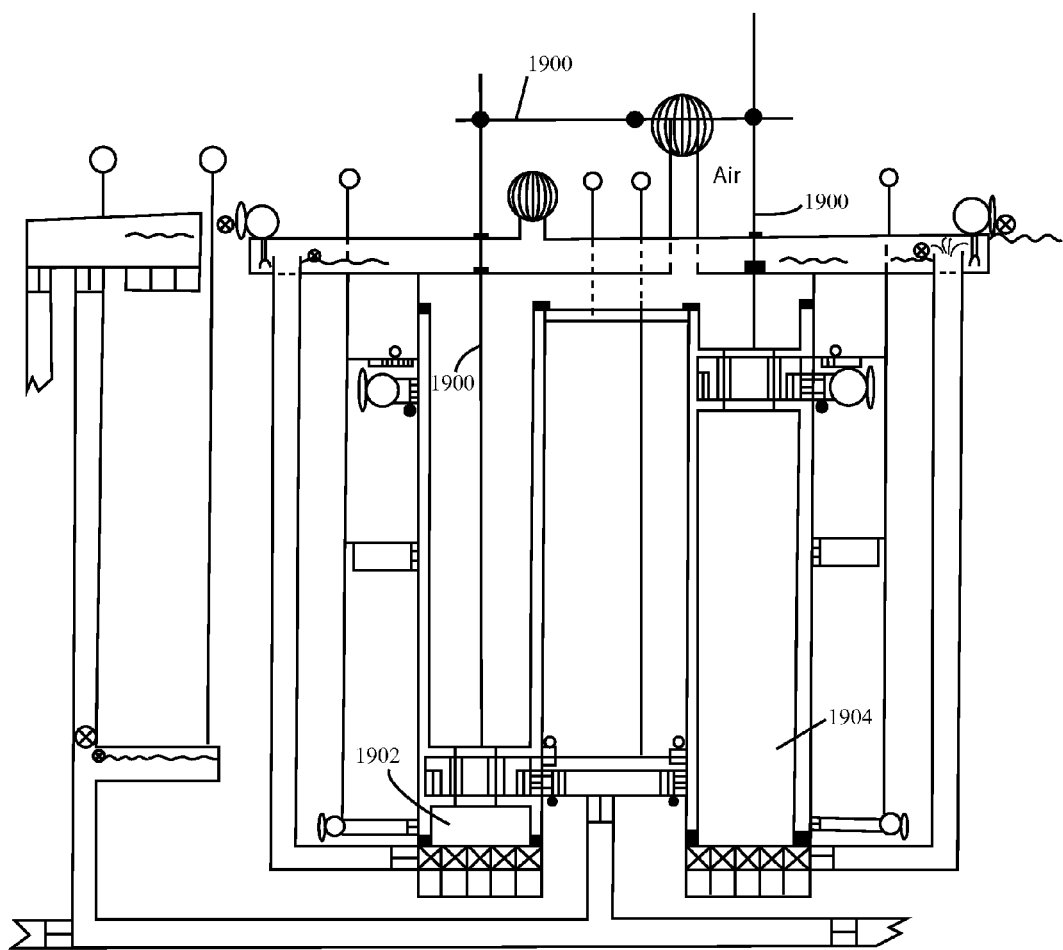
Figure 33:
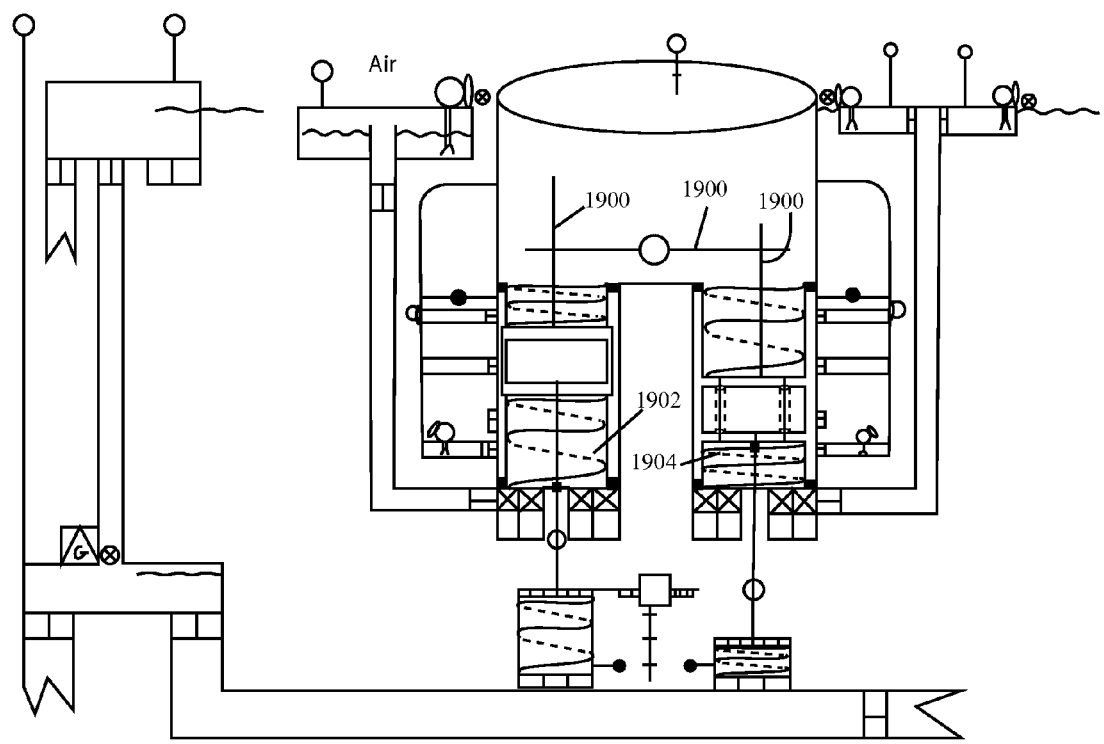

FIGS. 32-33 illustrate that constant volumetric regions may be open to atmosphere, wherein mechanical connections 1900 can be used in place of a working fluid to translate the pressure differentials created by normal operation of the plant between the first 1902 and second 1904 power chambers. FIG. 32 is a variation of FIG. 20 with a mechanical connection 1900 used in place of the constant volumetric region, and FIG. 33 is a variation of FIG. 15 with a mechanical connection 1900 used in place of the constant volumetric region.

Figure 34:
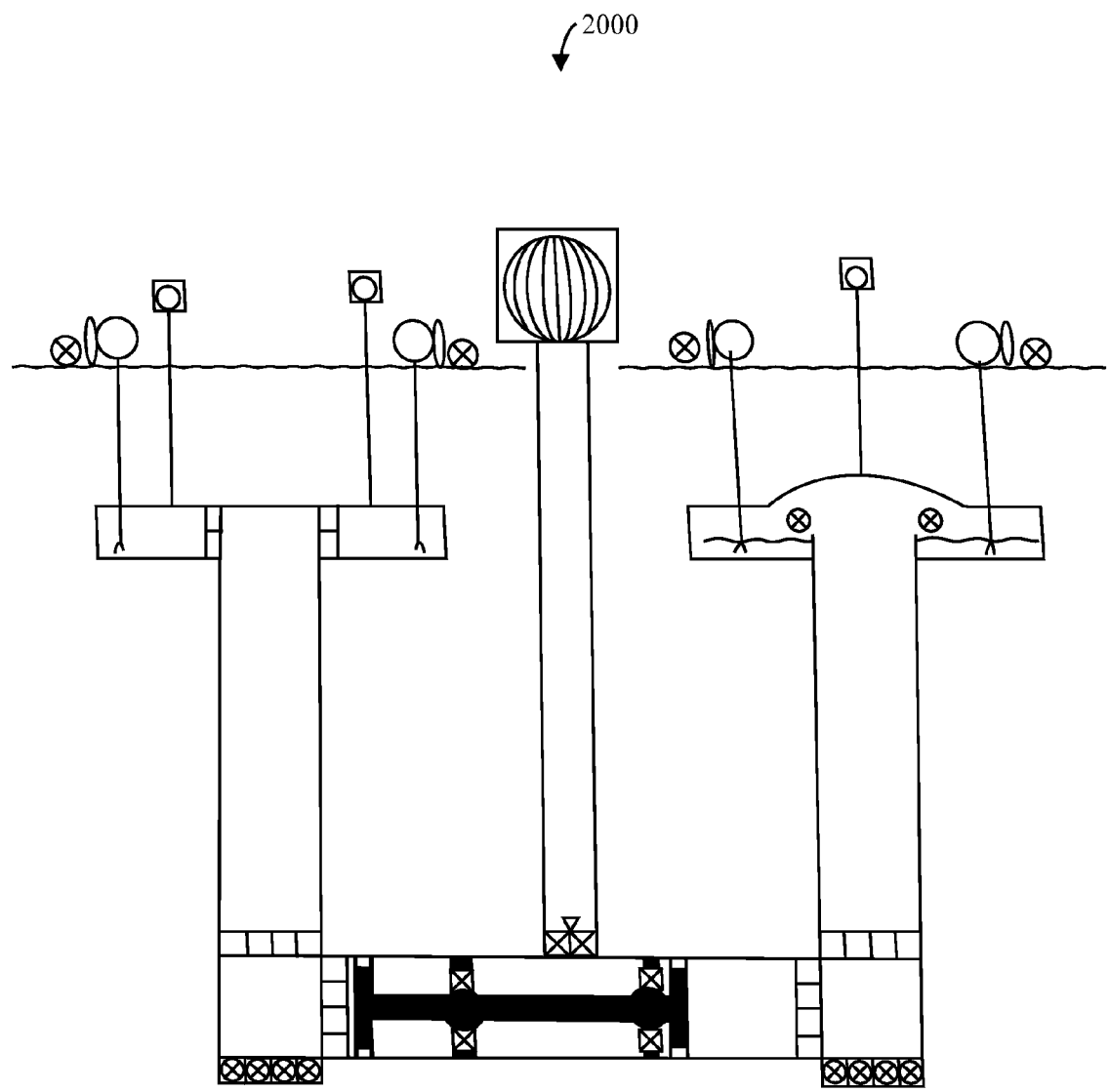
Figure 35:
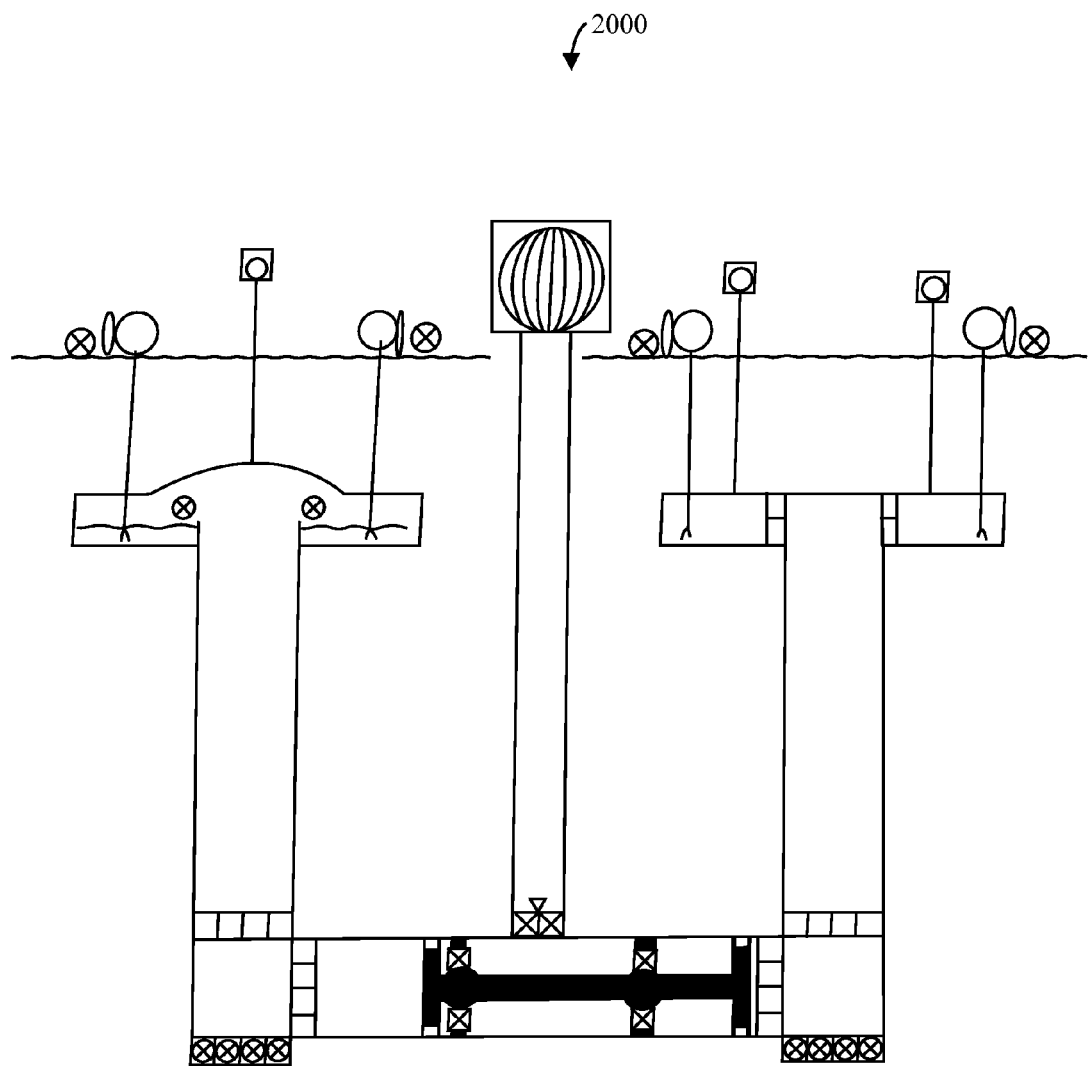

Finally, FIGS. 34-35 illustrate that vertical and horizontal positioning may be interchangeable in the given systems, wherein orientation is not meant to be limiting.

Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed is:

1. An apparatus for generating power within a reservoir containing a fluid, comprising:
   a pontoon chamber having a top end and a bottom end submerged within the fluid in the reservoir, comprising:
   an upper power chamber in fluid communication with the fluid in the reservoir via a first external valve positioned at the top end of the pontoon chamber, and wherein the volume of the upper power chamber is defined by an elastic boundary;
   a lower power chamber in fluid communication with the fluid in the reservoir via a second external valve positioned at the bottom end of the pontoon chamber, and wherein the volume of the lower power chamber is defined by an elastic boundary;
   a pontoon positioned between the upper and lower power chambers within the pontoon chamber; and
   a volume of fluid surrounding the pontoon whereby the pontoon is isolated from the pontoon chamber;
   where filling and emptying the pontoon chamber causes the pontoon to move upward or downward, directly contributing to the generation of power;
   an upper return system in fluid connection with the upper power chamber via an outlet valve of the upper power chamber actuatable to open when the upper power chamber contracts;

a lower return system in fluid connection with the lower power chamber via an outlet valve of the lower power chamber actuatable to open when the lower power chamber contracts;

at least one return station adapted to receive fluid from the upper and lower return systems, comprising:
- a return station chamber; and
- a return station pump having an inlet in fluid connection with the return station chamber and an outlet in fluid connection at approximately the level of the fluid in the reservoir;

a pontoon chamber draining and filling system comprising:
- at least one pontoon chamber compartment in fluid connection with the pontoon chamber between the top and bottom ends;
- a pontoon chamber compartment valve for each of the at least one pontoon chamber compartments actuatable to control flow of the fluid between the pontoon chamber compartment and the pontoon chamber;
- at least one filling valve actuatable to control flow of the fluid into the pontoon chamber from the reservoir; and
- at least one pump having an inlet in fluid connection with the at least one pontoon chamber and an outlet in fluid connection with the reservoir or the at least one filling valve; and a connecting rod mechanically coupled to the pontoon whereby movement of the pontoon in an up and down motion is transferred to a power generator to generate power.

2. The apparatus of claim 1 wherein the ratio of the sum of the volumes of the upper and lower power chambers to the volume of the pontoon chamber is greater than 5:1.

3. The apparatus of claim 1 wherein the pontoon chamber draining and filling system comprises:
- a lower pontoon chamber compartment in fluid connection with the pontoon chamber positioned near the bottom end of the pontoon chamber;
- a middle pontoon chamber compartment in fluid connection with the pontoon chamber and positioned approximately halfway between the top and bottom ends of the pontoon chamber;
- a pontoon chamber compartment valve for each of the lower and middle pontoon chamber compartments actuatable to control flow of the fluid between each pontoon chamber compartment and the pontoon chamber;
- a filling valve actuatable to control flow of the fluid into the pontoon chamber from the reservoir positioned near the top end of the pontoon chamber; and
- a pontoon chamber pump having an inlet in fluid connection with the lower pontoon chamber and an outlet in fluid connection with the reservoir.

4. The apparatus of claim 1 wherein the pontoon chamber draining and filling system comprises:
- a lower pontoon chamber compartment in fluid connection with the pontoon chamber positioned near the bottom end of the pontoon chamber;
- a middle pontoon chamber compartment in fluid connection with the pontoon chamber and positioned approximately halfway between the top and bottom ends of the pontoon chamber;
- a pontoon chamber compartment valve for each of the lower and middle pontoon chamber compartments actuatable to control flow of the fluid between each pontoon chamber compartment and the pontoon chamber;
- a filling valve actuatable to control flow of the fluid into the pontoon chamber from the reservoir positioned near the top end of the pontoon chamber; and
- a pontoon chamber pump having an inlet in fluid connection with the lower pontoon chamber and an outlet in fluid connection with the reservoir.

5. The apparatus of claim 1 wherein the at least one return station comprises an integrated fountain return system, comprising:
- a return station chamber having a floor and sidewalls defining the chamber;
- a return system inlet for each of the upper and lower return systems wherein a distal end of each return system opposite the respective outlet valve extends through the floor to an outlet located above the floor and below the level of the fluid in the reservoir, whereby fluid from the power chamber is received into the return station when the respective power chamber is contracting; and
- a return station pump having an inlet in fluid connection with the return station chamber and an outlet in fluid connection at approximately the level of the fluid in the reservoir.

6. The apparatus of claim 1 further comprising an artificial head system comprising:
- an upper artificial head chamber extending from the first external valve to an inlet outside of the fluid in the reservoir;
- an upper artificial head chamber pump having an inlet in the fluid in the reservoir and an outlet at the inlet of the upper artificial head chamber;
- a lower artificial head chamber extending from the second external valve to an inlet outside of the fluid in the reservoir; and
- a lower artificial head chamber pump having an inlet in the fluid in the reservoir and an outlet at the inlet of the lower artificial head chamber.

7. An apparatus for generating power within a reservoir containing a fluid, comprising:
- upper and lower artificial head systems, each comprising:
  - an artificial head chamber extending from distal end positioned above the surface of the fluid in the reservoir to a proximal end at a depth in the fluid; and
  - an artificial head system pump having an inlet near the surface of the fluid in the reservoir and an outlet distal end of the artificial head chamber;
- a pontoon chamber having a top end and a bottom end submerged within the fluid in the reservoir, comprising:
  - an upper power chamber in fluid communication with the proximal end of the artificial head chamber of the upper artificial head system via a first external valve positioned at the top end of the pontoon chamber, and wherein the volume of the upper power chamber is defined by an elastic boundary;
  - a lower power chamber in fluid communication with the proximal end of the artificial head chamber of the lower artificial head system via a second external valve positioned at the bottom end of the pontoon chamber, and wherein the volume of the lower power chamber is defined by an elastic boundary; and
  - a pontoon positioned between the upper and lower power chambers within the pontoon chamber; and
  - a volume of fluid surrounding the pontoon whereby the pontoon is isolated from the pontoon chamber;
  - where filling and emptying the pontoon chamber causes the pontoon to move upward or downward, directly contributing to the generation of power;
- an upper return system outlet valve whereby the upper power chamber is in fluid connection with the reservoir, and wherein the upper return system outlet is actuatable to open when the upper power chamber contracts;

a lower return system outlet valve whereby the lower power chamber is in fluid connection with the reservoir, and wherein the lower return system outlet is actuatable to open when the lower power chamber contracts;

a pontoon chamber draining and filling system comprising:
at least one pontoon chamber compartment in fluid connection with the pontoon chamber between the top and bottom ends;
a pontoon chamber compartment valve for each of the at least one pontoon chamber compartments actuatable to control flow of the fluid between the pontoon chamber compartment and the pontoon chamber;
at least one filling valve actuatable to control flow of the fluid into the pontoon chamber from the reservoir; and
at least one pump having an inlet in fluid connection with the at least one pontoon chamber and an outlet in fluid connection with the reservoir or the at least one filling valve; and a connecting rod mechanically coupled to the pontoon whereby movement of the pontoon in an up and down motion is transferred to a power generator to generate power.

8. The apparatus of claim 7 wherein the ratio of the sum of the volumes of the upper and lower power chambers to the volume of the pontoon chamber is greater than 5:1.

9. The apparatus of claim 7 wherein the pontoon chamber draining and filling system comprises:
a lower pontoon chamber compartment in fluid connection with the pontoon chamber positioned near the bottom end of the pontoon chamber;
a middle pontoon chamber compartment in fluid connection with the pontoon chamber and positioned approximately halfway between the top and bottom ends of the pontoon chamber;
a pontoon chamber compartment valve for each of the lower and middle pontoon chamber compartments actuatable to control flow of the fluid between each pontoon chamber compartment and the pontoon chamber;
a filling valve actuatable to control flow of the fluid into the pontoon chamber from the reservoir positioned near the top end of the pontoon chamber; and
a pontoon chamber pump having an inlet in fluid connection with the lower pontoon chamber and an outlet in fluid connection with the reservoir.

10. The apparatus of claim 7 wherein the pontoon chamber draining and filling system comprises:
a lower pontoon chamber compartment in fluid connection with the pontoon chamber positioned near the bottom end of the pontoon chamber;
a middle pontoon chamber compartment in fluid connection with the pontoon chamber and positioned approximately halfway between the top and bottom ends of the pontoon chamber;
a pontoon chamber compartment valve for each of the lower and middle pontoon chamber compartments actuatable to control flow of the fluid between each pontoon chamber compartment and the pontoon chamber;
a filling valve actuatable to control flow of the fluid into the pontoon chamber from the reservoir positioned near the top end of the pontoon chamber; and
a pontoon chamber pump having an inlet in fluid connection with the lower pontoon chamber and an outlet in fluid connection with the reservoir.

11. The apparatus of claim 7, further comprising:
an upper return system in fluid connection with the upper power chamber via an outlet valve of the upper power chamber actuatable to open when the upper power chamber contracts;
a lower return system in fluid connection with the lower power chamber via an outlet valve of the lower power chamber actuatable to open when the lower power chamber contracts; and
at least one return station adapted to receive fluid from the upper and lower return systems, comprising:
a return station chamber; and
a return station pump having an inlet in fluid connection with the return station chamber and an outlet in fluid connection at approximately the level of the fluid in the reservoir.

12. The apparatus of claim 11 wherein the at least one return station comprises an integrated fountain return system, comprising:
a return station chamber having a floor and sidewalls defining the chamber;
a return system inlet for each of the upper and lower return systems wherein a distal end of each return system opposite the respective outlet valve extends through the floor to an outlet located above the floor and below the level of the fluid in the reservoir, whereby fluid from the power chamber is received into the return station when the respective power chamber is contracting; and
a return station pump having an inlet in fluid connection with the return station chamber and an outlet in fluid connection at approximately the level of the fluid in the reservoir.

\* \* \* \* \*